US012638394B2

(12) United States Patent
Fujita et al.

(10) Patent No.: US 12,638,394 B2
(45) Date of Patent: May 26, 2026

(54) SKIN SENSITIZATION MEASURING REAGENT, METHOD FOR MEASURING SKIN SENSITIZATION, AND COMPOUND

(71) Applicant: FUJIFILM Corporation, Tokyo (JP)

(72) Inventors: Masaharu Fujita, Kanagawa (JP); Takashi Tamura, Kanagawa (JP); Toshihiko Kasahara, Kanagawa (JP); Yusuke Yamamoto, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 1048 days.

(21) Appl. No.: 17/702,794

(22) Filed: Mar. 24, 2022

(65) Prior Publication Data

US 2022/0214276 A1 Jul. 7, 2022

Related U.S. Application Data

(63) Continuation of application No. PCT/JP2020/036302, filed on Sep. 25, 2020.

(30) Foreign Application Priority Data

Sep. 26, 2019 (JP) ............................ JP2019-174999

(51) Int. Cl.
*C09K 11/00* (2006.01)
*C09K 11/06* (2006.01)
(Continued)

(52) U.S. Cl.
CPC .......... *G01N 21/6428* (2013.01); *C09K 11/06* (2013.01); *G01N 21/31* (2013.01);
(Continued)

(58) Field of Classification Search
CPC ................................................ G01N 21/6428
(Continued)

(56) References Cited

U.S. PATENT DOCUMENTS

2017/0196879 A1* 7/2017 Pache .................. A61K 31/20

FOREIGN PATENT DOCUMENTS

JP 2003014761 1/2003
JP 2007183208 7/2007
(Continued)

OTHER PUBLICATIONS

Wesche et al. "Combined Approach of Backbone Amide Linking and On-Resin N-Methylation for the Synthesis of Bioactive and Metabolically Stable Peptides" J. Med. Chem. 2018, 61, 3930-3938 (Year: 2018).*
(Continued)

*Primary Examiner* — Elizabeth A Robinson
*Assistant Examiner* — Emily R. Berkeley
(74) *Attorney, Agent, or Firm* — JCIPRNET

(57) ABSTRACT

An object of the present invention is to provide a skin sensitization measuring reagent, a method for measuring skin sensitization, and a compound that allow the sensitization of a test substance to be measured using a single reagent. According to the present invention, there is provided a skin sensitization measuring reagent including, as a main measuring agent, an organic compound having at least one thiol group derived from an amino acid and at least one amino group derived from a side chain of an amino acid. The organic compound has an absorption spectrum in an ultraviolet, visible, or near-infrared region and has a molar absorption coefficient of 100 L/mol·cm or more and 500,000 L/mol·cm or less at a maximal absorption wavelength.

3 Claims, 9 Drawing Sheets

(51) Int. Cl.
*G01N 21/31* (2006.01)
*G01N 21/64* (2006.01)
*G01N 30/72* (2006.01)
*G01N 30/02* (2006.01)

(52) U.S. Cl.
CPC .. *G01N 30/7233* (2013.01); *C09K 2211/1011* (2013.01); *C09K 2211/1048* (2013.01); *G01N 2021/3125* (2013.01); *G01N 2021/6439* (2013.01); *G01N 2030/027* (2013.01)

(58) Field of Classification Search
USPC .......................................................... 436/172
See application file for complete search history.

(56) References Cited

FOREIGN PATENT DOCUMENTS

| | | |
|---|---|---|
| JP | 2009222466 | 10/2009 |
| JP | 2011059102 | 3/2011 |
| JP | 2014037995 | 2/2014 |

OTHER PUBLICATIONS

"Search Report of Europe Counterpart Application", issued on Oct. 12, 2022, pp. 1-7.

"Office Action of Japan Counterpart Application" with English translation thereof, issued on Jan. 17, 2023, p. 1-p. 17.

G. Frank Gerberick et al., "Development of a Peptide Reactivity Assay for Screening Contact Allergens," Toxicological Sciences, vol. 81, Jul. 2004, pp. 332-343.

G. Frank Gerberick et al., "Quantification of Chemical Peptide Reactivity for Screening Contact Allergens: A Classification Tree Model Approach," Toxicological Sciences, vol. 97, Mar. 2007, pp. 417-427.

Michelle K. Dennehy et al., "Cytosolic and Nuclear Protein Targets of Thiol-Reactive Electrophiles," Chemical Research in Toxicology, vol. 19, Nov. 2005, pp. 20-29.

Andreas Natsch et al., "LC-MS-based characterization of the peptide reactivity of chemicals to improve the in vitro prediction of the skin sensitization potential," Toxicological Sciences, vol. 106, Sep. 2008, pp. 464-478.

Chin Lin Wong et al., "Evaluation of a High-Throughput Peptide Reactivity Format Assay for Assessment of the Skin Sensitization Potential of Chemicals," Frontiers in Pharmacology, vol. 7, Mar. 2016, pp. 1-14.

Renato Ivan De Avila et al., "The 21st Century movement within the area of skin sensitization assessment: From the animal context towards current human-relevant in vitro solutions," Regulatory Toxicology and Pharmacology, vol. 108, Aug. 2019, pp. 1-20.

Masaharu Fujita et al., "Development of a prediction method for skin sensitization using novel cysteine and lysine derivatives," Journal of Pharmacological and Toxicological Methods, vol. 70, Jun. 2014, pp. 94-105.

Frederick P. Schwarz et al., "Fluorescence measurements of benzene, naphthalene, anthracene, pyrene, fluoranthene, and benzo[e]pyrene in water," Analytical Chemistry, vol. 48, Mar. 1976, pp. 1-6.

Isabella Karlsson et al., "Peptide Reactivity of Isothiocyanates—Implications for Skin Allergy," Scientific Reports, Feb. 2016, pp. 1-12.

Tiancheng Liu et al., "Cell-Surface labeling and internalization by a fluorescent inhibitor of prostate-specific membrane antigen," The Prostate, Mar. 2008, pp. 955-964.

Masaharu Fujita et al., "A newly developed means of HPLC-fluorescence analysis for predicting the skin sensitization potential of multi-constituent substances using ADRA," Toxicology in Vitro, vol. 59, Apr. 2019, pp. 161-178.

"International Search Report (Form PCT/ISA/210) of PCT/JP2020/036302," mailed on Dec. 1, 2020, with English translation thereof, pp. 1-7.

"Written Opinion of the International Searching Authority (Form PCT/ISA/237)" of PCT/JP2020/036302, mailed on Dec. 1, 2020, with English translation thereof, pp. 1-12.

* cited by examiner

SKIN SENSITIZATION MEASURING REAGENT, METHOD FOR MEASURING SKIN SENSITIZATION, AND COMPOUND

CROSS-REFERENCE TO RELATED APPLICATIONS

This application is a Continuation of PCT International Application No. PCT/JP2020/036302 filed on Sep. 25, 2020, which claims priority under 35 U.S.C. § 119(a) to Japanese Patent Application No. 2019-174999 filed on Sep. 26, 2019. Each of the above application(s) is hereby expressly incorporated by reference, in its entirety, into the present application.

BACKGROUND OF THE INVENTION

1. Field of the Invention

The present invention relates to skin sensitization measuring reagents, methods for measuring skin sensitization, and compounds.

2. Description of the Related Art

Skin sensitization (allergy) may involve not only local symptoms such as blisters and redness in areas exposed to substances, but also severe, life-threatening systemic allergic reactions known as anaphylaxis. In addition, skin sensitization is thought to be one of the important toxicities because, for example, once it develops, care needs to be taken to avoid exposure over a long period of time.

It is important that chemical substances present in products such as medicines, agricultural chemicals, and cosmetics be substances that do not cause allergic reactions. In product development, the chemical substances used need to be inspected for skin sensitization.

Conventionally, test methods using guinea pigs are commonly known as methods for evaluating chemical substances for skin sensitization, and test methods such as the Guinea Pig Maximisation Test (GPMT), which uses adjuvants, and the Buehler Test, which is a non-adjuvant test, have been widely used for a long time. On the other hand, recently, research and development have been made in alternatives to animal testing to meet ethical and social requirements such as animal welfare. In particular, there is an urgent need for the development of alternatives to skin sensitization tests that show severe symptoms, and in vitro tests using cultured cells and in chemico tests based on chemical reactions have been developed.

Examples of known in vitro tests include the ARE-Nrf2 luciferase KeratinoSens™ test method (KeratinoSens is a registered trademark), the ARE-NrF2 lusiferase LuSens test method (LuSens), the human Cell Line Activation Test (h-CLAT), the Myeloid U937 Skin Sensitization Test (U-SENS), and IL-8 Luc assay.

In chemico tests based on chemical reactions, which do not use cultured cells, have many advantages such as requiring no special technology, knowledge, or equipment. For example, Gerberick, G. F., Vassallo, J. D., Bailey, R. E., Chaney, J. G., Morrall, S. W., and Lepoittevin, J. P. (2004), Development of a peptide reactivity assay for screening contact allergens, Toxicological Sciences, 81(2), 332-43 (Non Patent Literature 1) and Gerberick, G. F., Vassallo, J. D., Foertsch, L. M., Price, B. B., Chaney, J. G., and Lepoittevin, J. P. (2007), Quantification of chemical peptide reactivity for screening contact allergens: a classification tree model approach, Toxicological Sciences, 97(2), 417-27 (Non Patent Literature 2) describe methods using two peptides (cysteine and lysine peptides) as nucleophilic reagents (Direct Peptide Reactivity Assay (DPRA)). In addition, JP2011-59102A (Patent Literature 1) and JP2014-37995A (Patent Literature 2) describe skin sensitization measuring reagents and methods for measuring skin sensitization using a cysteine derivative having an aryl ring introduced therein and a lysine derivative having an aryl ring introduced therein as nucleophilic reagents.

The methods described in Non Patent Literatures 1 and 2 and Patent Literatures 1 and 2 take time for evaluation because two reagents including cysteine and lysine are separately chemically reacted with a test substance and are separately subjected to measurement and quantification for calculation of depletion. Accordingly, a test method in which a skin sensitizer is detected and evaluated using a peptide including both cysteine and lysine has also been reported. However, this evaluation method, in which the reagent used is the heptapeptide Cor1C-420 (Ac-Asn-Lys-Lys-Cys-Asp-Leu-Phe) (derived from the sequence around cysteine at residue 420 from the N-terminus of the human Coronin-1 protein, which is a site with very high reactivity toward electrophilic reagents (Denny M K, Richards A M, Wemke G R, Shyr Y, Liebler D C (2006), Cytosolic and nuclear protein targets of thiol-reactive electrophiles, Chemical Research in Toxicology, 19, 20-29 (Non Patent Literature 3))), is a test method in which mass spectrometry is used for measurement; therefore, optical detection using light such as UV or visible light cannot be performed. In addition, this method is not intended to shorten the measurement time by including cysteine and lysine.

Natsch A, Gfeller H (2008), LC-MS-based characterization of the peptide reactivity of chemicals to improve the in vitro prediction of the skin sensitization potential, Toxicological Sciences, 106(2), 464-78 (Non Patent Literature 4) describes five features: (1) a peptide-test substance adduct (covalent adduct) can be distinguished from peptide oxidation; (2) the problem of the sedimentation of a test substance does not occur because the concentration of the test substance in the reaction solution can be reduced; (3) the problem of the solubility of a test substance is alleviated because the preparation concentration of the test substance can be reduced; (4) the problem of co-elution does not occur because LC-MS measurement is used; and (5) a test substance with high reactivity can be more accurately evaluated by kinetic measurement. In addition, Wong C L, Lam A L, Smith M T, Ghassabian S (2016), Evaluation of a High-Throughput Peptide Reactivity Format Assay for Assessment of the Skin Sensitization Potential of Chemicals, Frontiers in Pharmacology, 14, 7(53), 1-14 (Non Patent Literature 5) states that the evaluation of three peptides, namely, the two peptides used in DPRA and the heptapeptide mentioned above, allows for high prediction accuracy. Furthermore, JP2009-222466A (Patent Literature 3) describes a skin sensitization detection reagent having a fluorescent dye attached to a terminus of a peptide.

SUMMARY OF THE INVENTION

In the skin sensitization measurement methods described in Non Patent Literatures 1 and 2, two reagents, namely, cysteine and lysine peptides, are used and separately reacted with a test substance. These reaction solutions are separately subjected to measurement by high-performance liquid chromatography (HPLC). The depletion is calculated from the amount of unreacted peptide in each solution, and the mean thereof (mean depletion) is calculated. It is predicted that the test substance is a skin sensitizer if the mean (mean depletion) exceeds a criterion, whereas it is predicted that the test substance is a non-sensitizer if the mean (mean depletion) does not exceed the criterion. This test method takes time because the two reagents are separately reacted and are separately subjected to measurement and quantification. In Non Patent Literatures 4 and 5, there is no mention of increasing the efficiency of measurement using a peptide including cysteine and lysine for efficient measurement. In addition, although a thiol group derived from cysteine is present in the peptide used as the skin sensitization detection reagent described in Patent Literature 3, the amino group used is an a-amino group of an amino acid. The great majority of amino groups in proteins in a living body are those derived from lysine, which differ in reactivity from a-amino groups.

An object of the present invention is to provide a skin sensitization measuring reagent, a method for measuring skin sensitization, and a compound that allow the sensitization of a test substance to be measured using a single reagent.

After conducting intensive research in order to achieve the foregoing object, the inventors have found that an organic compound having at least one thiol group derived from an amino acid and at least one amino group derived from a side chain of an amino acid can be used as a skin sensitization measuring reagent, which has led to the completion of the present invention. According to the present invention, the following inventions are provided.

<1> A skin sensitization measuring reagent including, as a main measuring agent, an organic compound having at least one thiol group derived from an amino acid and at least one amino group derived from a side chain of an amino acid, the organic compound having an absorption spectrum in an ultraviolet, visible, or near-infrared region and having a molar absorption coefficient of 100 L/mol·cm or more and 500,000 L/mol·cm or less at a maximal absorption wavelength.

<2> The skin sensitization measuring reagent according to <1>, wherein the organic compound has emission at 200 to 800 nm.

<3> The skin sensitization measuring reagent according to <1> or <2>, wherein the amino group is an amino group derived from a side chain of lysine.

<4> The skin sensitization measuring reagent according to any one of <1> to <3>, wherein the organic compound is represented by the following formula (1):

$$W\text{-}[(L^1\text{-}Xaa\text{-}L^2)_p\text{-}Z]_q \quad (1)$$

wherein

W represents a q-valent group having an absorption spectrum in the ultraviolet, visible, or near-infrared region, $L^1$ and $L^2$ each independently represent a single bond or a linking group, Xaa represents an amino acid residue, provided that p×q Xaa moieties include at least one lysine residue and at least one cysteine residue, Z represents a hydrogen atom or an alkyl group having 1 to 6 carbon atoms, wherein the alkyl group having 1 to 6 carbon atoms is optionally substituted with a substituent selected from the group consisting of a carboxyl group, an amino group, a hydroxy group, a guanidyl group, a pyridine ring, and an imidazole ring, p represents an integer of 1 to 5, q represents an integer of 1 to 3, provided that p and q are not simultaneously 1, if p is 2 or more, $L^1$-Xaa-$L^2$ moieties may be the same or different, and if q is 2 or more, $[(L^1\text{-}Xaa\text{-}L^2)_p\text{-}Z]$ moieties may be the same or different.

<5> The skin sensitization measuring reagent according to <4>, wherein W is a q-valent group having a naphthalene ring structure.

<6> The skin sensitization measuring reagent according to any one of <1> to <5>, wherein the organic compound has a partial structure represented by any of the following formulas (A) to (F):

(A)

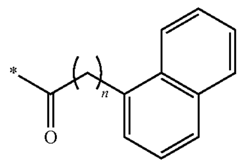

(B)

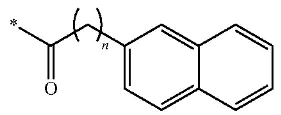

(C)

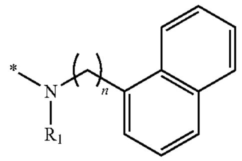

(D)

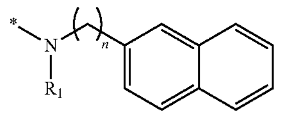

(E)

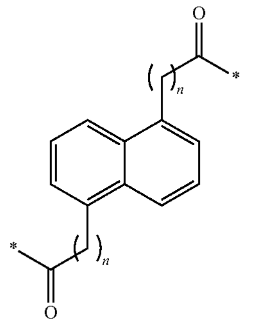

(F)

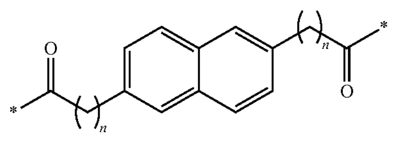

wherein $R_1$ represents a hydrogen atom or an alkyl group having 1 to 6 carbon atoms, n represents an integer of 0 to 3, and * represents a linking site.

<7> The skin sensitization measuring reagent according to any one of <1> to <6>, wherein the organic compound is represented by the following formula (2), (3), (4), (5), or (6):

(2)

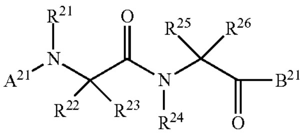

wherein $A^{21}$ represents a group having an absorption spectrum in the ultraviolet, visible, or near-infrared region, $R^{21}$ to $R^{26}$ represent a hydrogen atom or a substituent, provided that at least one of the substituents represented by $R^{21}$ to $R^{26}$ has a thiol group, and at least one of the substituents represented by $R^{21}$ to $R^{26}$ has an amino group, and $B^{21}$ represents a hydroxy group, an amino group, an α-amino acid residue, a β-amino acid residue, a γ-amino acid residue, or a peptide residue, (3)

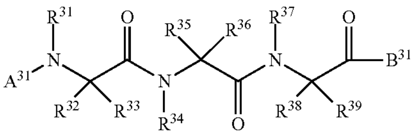

wherein $A^{31}$ represents a group having an absorption spectrum in the ultraviolet, visible, or near-infrared region, $R^{31}$ to $R^{39}$ represent a hydrogen atom or a substituent, provided that the substituents represented by $R^{31}$ to $R^{39}$ include one thiol group and one amino group, and $B^{31}$ represents a hydroxy group, an amino group, an α-amino acid residue, a β-amino acid residue, a γ-amino acid residue, or a peptide residue, (4)

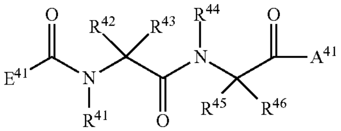

wherein $A^{41}$ represents a group having an absorption spectrum in the ultraviolet, visible, or near-infrared region, $R^{41}$ to $R^{46}$ represent a hydrogen atom or a substituent, provided that at least one of the substituents represented by $R^{41}$ to $R^{46}$ has a thiol group, and at least one of the substituents represented by $R^{41}$ to $R^{46}$ has an amino group, and $E^{41}$ represents an alkyl group having 1 to 6 carbon atoms that is optionally substituted with a substituent selected from the group consisting of a carboxyl group, an amino group, a hydroxy group, a guanidyl group, a pyridine ring, and an imidazole ring, (5)

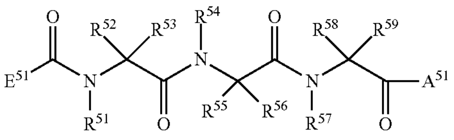

wherein $A^{51}$ represents a group having an absorption spectrum in the ultraviolet, visible, or near-infrared region, $R^{51}$ to $R^{59}$ represent a hydrogen atom or a substituent, provided that at least one of the substituents represented by $R^{51}$ to $R^{59}$ has a thiol group, and at least one of the substituents represented by $R^{51}$ to $R^{59}$ has an amino group, and $E^{51}$ represents an alkyl group having 1 to 6 carbon atoms that is optionally substituted with a substituent selected from the group consisting of a carboxyl group, an amino group, a hydroxy group, a guanidyl group, a pyridine ring, and an imidazole ring, (6)

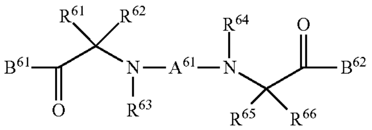

wherein $A^{61}$ represents a group having an absorption spectrum in the ultraviolet, visible, or near-infrared region, $R^{61}$ to $R^{66}$ represent a hydrogen atom or a substituent, provided that at least one of the substituents represented by $R^{61}$ to $R^{66}$ has a thiol group, and at least one of the substituents represented by $R^{61}$ to $R^{66}$ has an amino group, and $B^{61}$ and $B^{62}$ each independently represent a hydroxy group, an amino group, an α-amino acid residue, a β-amino acid residue, a γ-amino acid residue, or a peptide residue.

<8> The skin sensitization measuring reagent according to <7>, wherein $A^{21}$ in formula (2) and $A^{31}$ in formula (3) are any of:

(A)

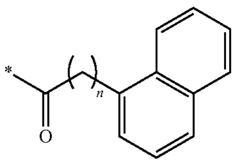

(B)

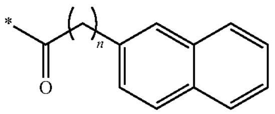

$A^{41}$ in formula (4) and $A^{51}$ in formula (5) are any of:

(C)

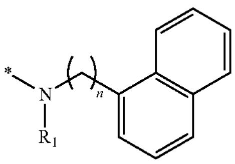

(D)

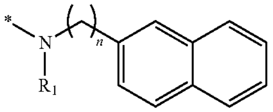

$A^{61}$ in formula (6) is:

(F)

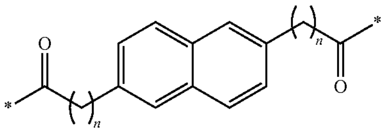

wherein $R_1$ represents a hydrogen atom or an alkyl group having 1 to 6 carbon atoms, n represents an integer of 0 to 3, and * represents a linking site.

<9> A method for measuring skin sensitization, including:

(1) reacting the skin sensitization measuring reagent according to any one of <1> to <8> with a test substance; and (2) determining an amount of the skin sensitization measuring reagent after the reaction or an amount of a product of the reaction by an optical measurement.

<10> The method for measuring skin sensitization according to <9>, wherein the test substance is at least one of a perfume, an essential oil, a polymer compound, a medicine, an agricultural chemical, food, a chemical product, or a plant extract made of a naturally derived component.

<11> The method for measuring skin sensitization according to <9> or <10>, further including chromatographing the reaction product obtained by the step of reacting the skin sensitization measuring reagent with the test substance.

<12> The method for measuring skin sensitization according to any one of <9> to <11>, wherein the optical measurement is a measurement using a fluorescence detector at an excitation wavelength of 200 to 350 nm and a fluorescence wavelength of 200 to 400 nm.

<13> A compound represented by the following formula (2), (3), (4), (5), or (6):

(2)

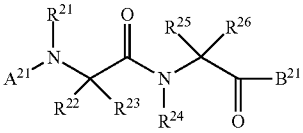

wherein $A^{21}$ represents a group having an absorption spectrum in the ultraviolet, visible, or near-infrared region, $R^{21}$ to $R^{26}$ represent a hydrogen atom or a substituent, provided that at least one of the substituents represented by $R^{21}$ to $R^{26}$ has a thiol group, and at least one of the substituents represented by $R^{21}$ to $R^{26}$ has an amino group, and $B^{21}$ represents a hydroxy group, an amino group, an α-amino acid residue, a β-amino acid residue, a γ-amino acid residue, or a peptide residue, (3)

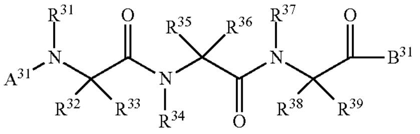

wherein $A^{31}$ represents a group having an absorption spectrum in the ultraviolet, visible, or near-infrared region, $R^{31}$ to $R^{39}$ represent a hydrogen atom or a substituent, provided that at least one of the substituents represented by $R^{31}$ to $R^{39}$ has a thiol group, and at least one of the substituents represented by $R^{31}$ to $R^{39}$ has an amino group, and $B^{31}$ represents a hydroxy group, an amino group, an α-amino acid residue, a β-amino acid residue, a γ-amino acid residue, or a peptide residue, (4)

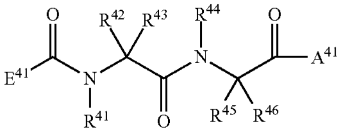

wherein $A^{41}$ represents a group having an absorption spectrum in the ultraviolet, visible, or near-infrared region, $R^{41}$ to $R^{46}$ represent a hydrogen atom or a substituent, provided that at least one of the substituents represented by $R^{41}$ to $R^{46}$ has a thiol group, and at least one of the substituents represented by $R^{41}$ to $R^{46}$ has an amino group, and $E^{41}$ represents an alkyl group having 1 to 6 carbon atoms that is optionally substituted with a substituent selected from the group consisting of a carboxyl group, an amino group, a hydroxy group, a guanidyl group, a pyridine ring, and an imidazole ring, (5)

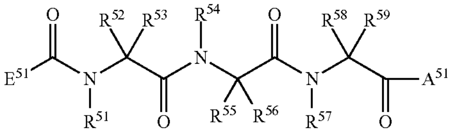

wherein $A^{51}$ represents a group having an absorption spectrum in the ultraviolet, visible, or near-infrared region, $R^{51}$ to $R^{59}$ represent a hydrogen atom or a substituent, provided that at least one of the substituents represented by $R^{51}$ to $R^{59}$ has a thiol group, and at least one of the substituents represented by $R^{51}$ to $R^{59}$ has an amino group, and $E^{51}$ represents an alkyl group having 1 to 6 carbon atoms that is optionally substituted with a substituent selected from the group consisting of a carboxyl group, an amino group, a hydroxy group, a guanidyl group, a pyridine ring, and an imidazole ring, (6)

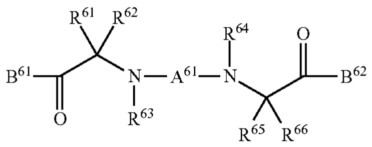

wherein $A^{61}$ represents a group having an absorption spectrum in the ultraviolet, visible, or near-infrared region, $R^{61}$ to $R^{66}$ represent a hydrogen atom or a substituent, provided that at least one of the substituents represented by $R^{61}$ to $R^{66}$ has a thiol group, and at least one of the substituents represented by $R^{61}$ to $R^{66}$ has an amino group, and $B^{61}$ and $B^{62}$ each independently represent a hydroxy group, an amino group, an α-amino acid residue, a β-amino acid residue, a γ-amino acid residue, or a peptide residue.

<14> The compound according to <13>, wherein the group having an absorption spectrum in the ultraviolet, visible, or near-infrared region is a group having a naphthalene ring structure.

<15> The compound according to <13> or <14>, wherein $A^{21}$ in formula (2) and $A^{31}$ in formula (3) are any of:

(A)

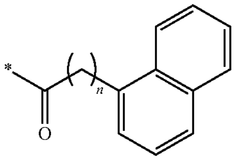

(B)

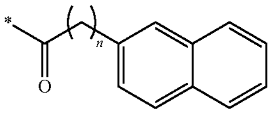

$A^{41}$ in formula (4) and $A^{51}$ in formula (5) are any of:

(C)

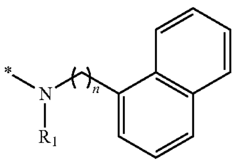

(D)

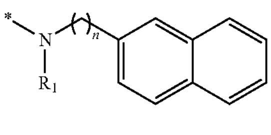

$A^{61}$ in formula (61 is:

(F)

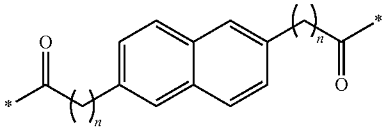

wherein $R_1$ represents a hydrogen atom or an alkyl group having 1 to 6 carbon atoms, n represents an integer of 0 to 3, and * represents a linking site.

According to the present invention, the skin sensitization of chemical substances can be quickly measured in a simple manner.

DESCRIPTION OF THE PREFERRED EMBODIMENTS

Figure 1:
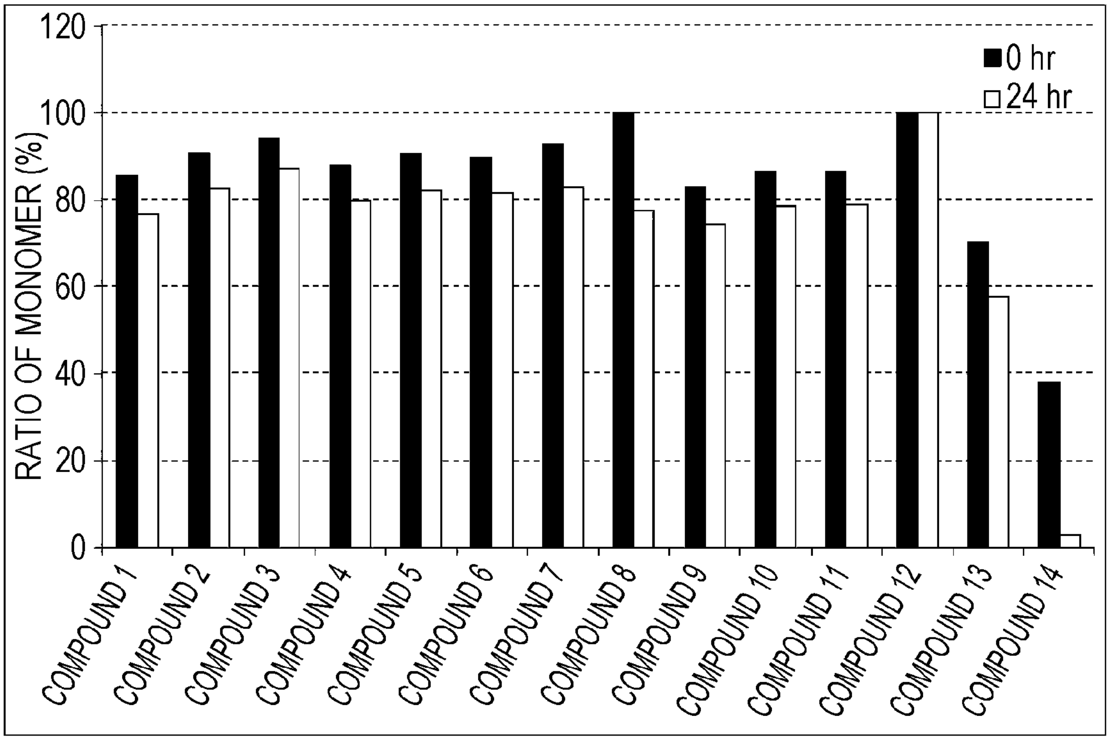
FIG. 1 shows stability measurement results for 14 nucleophilic reagents (Compounds 1 to 14)

In the present specification, "to" is meant to include the values recited before and after "to" as the lower and upper limits.

In the present specification, "measurement of skin sensitization" is meant to include assay of skin sensitization and is also meant to include determination of the presence or absence of skin sensitization based on a certain criterion and quantitative measurement of skin sensitization.

Skin sensitization develops through a complicated process composed of a large number of stages. The first event is that a test substance permeates through the skin and covalently bonds to a protein in the skin. Thus, it is thought that, by evaluating this covalent bonding, it is possible to predict whether the target test substance is a skin sensitizer. The reaction of the test substance with the protein in the skin is known to be roughly due to five organic chemical reactions. It is known that the amino acids involved in these five reactions are the SH group of cysteine and the $NH_2$ group of lysine. Accordingly, in the measurement of skin sensitization described in Patent Literatures 1 and 2, two nucleophilic reagents having a naphthalene ring, which has a high molar absorption coefficient in the UV region, introduced into the N-termini of cysteine and lysine are each chemically synthesized, and these two nucleophilic reagents are reacted with a test substance. By quantifying the unreacted nucleophilic reagent, the reactivity with the test substance is calculated, and skin sensitization is predicted.

In the present invention, a nucleophilic reagent has been synthesized that includes a thiol group derived from an amino acid and an amino group derived from a side chain of an amino acid in the same molecule and that has introduced into the N-terminus or C-terminus thereof a structure having a high molar absorption coefficient in the UV region and having fluorescence (e.g., a naphthalene ring). It has been demonstrated that skin sensitization can be predicted by evaluating and quantifying the reaction of this nucleophilic reagent with a test substance.

A skin sensitization measuring reagent according to the present invention has a structure having UV absorption and fluorescence (e.g., a naphthalene ring) at a terminus of a peptide and is designed to allow high-sensitivity detection. Thus, the skin sensitization measuring reagent allows evaluation with a UV detector or fluorescence detector, which is inexpensive and easily available but is difficult to use in conventional evaluation methods using peptides including cysteine and lysine. According to the present invention, the amount of reagent and the work time can also be reduced as compared to conventional methods, thus leading to a significant efficiency improvement and cost reduction.

In addition, conventional methods using a peptide including a thiol group and an amino group in one molecule have low peptide detection sensitivity and do not allow optical detection; therefore, a detection method using an LC-MS, which is an expensive apparatus, as detection means is employed. In contrast, according to the present invention, evaluation can be performed only using an inexpensive detector using UV or fluorescence.

Furthermore, in test methods using a peptide combined with a chromophore such as one that emits fluorescence, the reactivity of an amino group of a side chain with a test substance is evaluated. However, artificial peptides in which an amino group of a side chain is bonded to the main chain has a problem in that, for example, biological reactions cannot be correctly evaluated because such peptides differ in the form of bonding from peptides present in a living body. On the other hand, the method for measuring skin sensitization according to the present invention uses a peptide that correctly reflects a peptide bond present in a living body and is therefore an evaluation method that more accurately reflects a chemical reaction (biological reaction) that occurs in a living body and thus allows skin sensitization to be correctly predicted.

The skin sensitization measuring reagent according to the present invention includes, as a main measuring agent, an organic compound having at least one thiol group derived from an amino acid and at least one amino group derived from a side chain of an amino acid. The organic compound has an absorption spectrum in the ultraviolet, visible, or near-infrared region and has a molar absorption coefficient of 100 L/mol·cm or more and 500,000 L/mol·cm or less at the maximal absorption wavelength.

The organic compound used in the present invention is a compound that has an absorption spectrum in the ultraviolet, visible, or near-infrared region and that exhibits absorption as-is or in solution form, preferably in a wavelength range of 190 to 2,500 nm, more preferably a compound that exhibits absorption in a wavelength range of 200 to 700 nm. Even more preferred is a compound having maximal absorption in the above wavelength range.

The organic compound used in the present invention is a compound that has a molar absorption coefficient of 100 L/mol·cm or more and 500,000 L/mol·cm or less at the maximal absorption wavelength, preferably a compound that has a molar absorption coefficient (L/mol·cm) of 100 L/mol·cm or more and 2,000 L/mol·cm or less at the maximal absorption wavelength. Particularly preferred is a compound that has maximal absorption in a wavelength range of 200 to 700 nm and that has a molar absorption coefficient of 100 L/mol·cm or more and 2,000 L/mol·cm or less at the maximal absorption wavelength.

The molar absorption coefficient (E) is given by the following equation:

$$\varepsilon = D/(c \cdot d)$$

where D represents the absorbance of the solution, c represents the molar concentration (mol/L) of the solute, and d represents the thickness (cm) of the solution layer (optical path length). The molar absorption coefficient can be determined by measuring the absorption spectrum or absorbance using a commercially available spectrophotometer.

The organic compound used in the present invention is preferably a compound having emission at 200 to 800 nm, more preferably a compound having emission at 250 to 600 nm, even more preferably a compound having emission at 300 to 500 nm.

The organic compound used in the present invention has at least one thiol group derived from an amino acid and at least one amino group derived from a side chain of an amino acid. Preferably, the organic compound used in the present invention includes at least an amino acid residue having a thiol group and an amino acid residue having an amino group in a side chain thereof. The amino acid residue having a thiol group may be, for example, a cysteine residue. The amino acid residue having an amino group in a side chain thereof may be, for example, a lysine residue. That is, the thiol group derived from an amino acid is preferably a thiol group derived from cysteine, and the amino group derived from a side chain of an amino acid is preferably an amino group derived from a side chain of lysine.

As described above, the organic compound used in the present invention is preferably a compound including an amino acid residue. More preferred is a compound represented by the following formula (1):

$$W\text{-}[(L^1\text{-}Xaa\text{-}L^2)_p\text{-}Z]_q \quad (1)$$

W represents a q-valent group having an absorption spectrum in the ultraviolet, visible, or near-infrared region.

Preferably, W is a q-valent group derived from an organic compound having an absorption spectrum in the ultraviolet, visible, or near-infrared region.

The organic compound having an absorption spectrum in the ultraviolet, visible, or near-infrared region is a compound having absorption in the range from 200 nm to 2,500 nm. Examples of such compounds include naphthalene derivatives, anthracene derivatives, phenanthrene derivatives, tetracene derivatives, pentacene derivatives, benzopyrene derivatives, chrysene derivatives, pyrene derivatives, triphenylene derivatives, corannulene derivatives, coronene derivatives, ovalene derivatives, acridine derivatives, luciferin derivatives, pyranine derivatives, stilbene derivatives, benzofuran derivatives, dihydroquinoxalinone derivatives, phthalimidinyl derivatives, dansyl derivatives, merocyanine derivatives, perylene derivatives, rhodamine derivatives, coumarin derivatives, 4-(dicyanomethylene)-2-methyl-6-(4-dimethylaminostyryl)-4H-pyran (DCM) derivatives, pyrromethene derivatives, fluorescein derivatives, umbelliferone derivatives, benzothiazole derivatives, benzoxadiazole derivatives, shikonin derivatives, fluoranthene derivatives, carbazole derivatives, tetraphene derivatives, acenaphthene derivatives, and fluorene derivatives. Specific examples include compounds derived from 2-naphthylacetyl chloride, 4-(5,6-dimethoxy-N-phthalimidinyl)benzenesulfonic acid chloride (DPS-CL), 4-chloro-7-nitro-2,1,3-benzoxadiazole (NBD-CL), fluorescein isothiocyanate (FITC), rhodamine B isothiocyanate (RBITC), 4-fluoro-7-nitro-2,1,3-benzoxadiazole (NDB-F), 4-(N,N-dimethylaminosulfonyl)-7-fluoro-2,1,3-benzoxadiazole (DBD-F), 4-(N-phthalimidinyl)benzenesulfonic acid chloride (PHISYL-CL), 4-aminosulfonyl-7-fluoro-2,1,3-benzoxadiazole (ABD-F), N-[4-(6-dimethylamino-2-benzofuranyl)phenyl]maleimide (DBPM), 2-(4-maleimidophenyl)-6-methylbenzothiazole (MBPM), N-(9-acridinyl)maleimide (NAM), 4-chloro-7-sulfobenzofurazane ammonium salt (SBD-CL), 7-fluorobenzofurazane-4-sulfonic acid ammonium salt (SBD-F), 1,2-diamino-4,5-dimethoxybenzene (DDB), 4-(N,N-dimethylaminosulfonyl)-7-hydrazino-2,1,3-benzoxadiazole (DBD-H), 4-hydrazino-7-nitro-2,1,3-benzoxadiazole hydrazine (DBD-H), 2,2'-dithiodi(1-naphthylamine) (DTAN), 4-amino-3-penten-2-one (FLUORAL-P), 1,2-amino-4,5-methylenedioxybenzene (MDB), 4-(5,6-dimethoxybenzothiazol-2-yl)benzoic acid hydrazide (BHBT), 4-(N,N-dimethylaminosulfonyl)-7-(N-hydrazinocarbonylmethyl-N-methyl)amino-2,1,3-benzoxadiazole (DBD-CO-HZ), 4-(N-hydrazinocarbonylmethyl-N-methylamino)-7-nitro-2,1,3-benzoxadiazole (NBD-CO-HZ), 3-bromomethyl-6,7-dimethoxy-1-methyl-1,2-dihydroquinoxalin-2-one (BR-DMEQ), 4-bromomethyl-7-methoxycoumarin (BR-MMC), 4-(N,N-dimethylaminosulfonyl)-7-piperazino-2,1,3-benzoxadiazole (DBD-PZ), 4-nitro-7-piperazino-2,1,3-benzoxadiazole (NBD-PZ), 4-(N,N-dimethylaminosulfonyl)-7-(2-aminoethylamino)-2,1,3-benzoxadiazole (DBD-ED), 3-chlorocarbonyl-6,7-dimethoxy-1-methyl-2(1H)-quinoxalinone (DMEQ-COCL), and 2-(5-chlorocarbonyl-2-oxazolyl)-5,6-methylenedioxybenzofuran (OMB-COCL).

Of these, W is preferably a q-valent group having a naphthalene ring structure.

If W is a q-valent group having a naphthalene ring structure, the organic compound preferably has a partial structure represented by any of the following formulas (A) to (F):

(A)

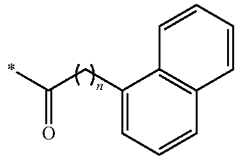

(B)

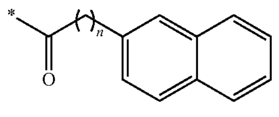

(C)

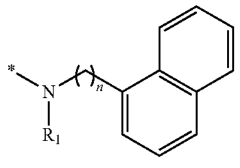

(D)

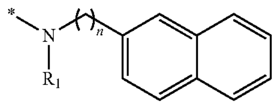

(E)

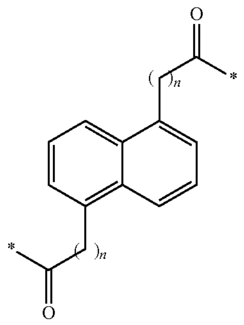

(F)

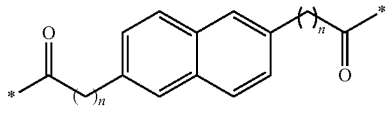

where $R_1$ represents a hydrogen atom or an alkyl group having 1 to 6 carbon atoms, n represents an integer of 0 to 3, and * represents a linking site.

$L^1$ and $L^2$ each independently represent a single bond or a linking group.

The linking group represented by $L^1$ and $L^2$ may be an alkylene group having 1 to 6 carbon atoms, —NH—, —CO—, —O—, —COO—, —OCO—, or any combination thereof. Particularly preferred examples of linking groups represented by $L^1$ and $L^2$ include —$CH_2$—NH— and —NH—$CH_2$—.

Xaa represents an amino acid residue, provided that p×q Xaa moieties include at least one lysine residue and at least one cysteine residue.

The amino acid of the amino acid residue represented by Xaa is not particularly limited as long as the amino acid is a compound having an amino group and a carboxyl group. The amino acid may be an α-amino acid, a β-amino acid, or a γ-amino acid. The α-amino acid may be, for example, a naturally occurring amino acid that forms a protein, a naturally occurring amino acid that does not form a protein, or a non-naturally-occurring amino acid. That is, the amino acid residue represented by Xaa may be an α-amino acid residue, a β-amino acid residue, or a γ-amino acid residue.

The α-amino acid is preferably an amino acid that forms a protein. Specific examples include alanine, cysteine, aspartic acid, glutamic acid, phenylalanine, glycine, histidine, isoleucine, lysine, leucine, methionine, asparagine, proline, glutamine, arginine, serine, threonine, valine, tryptophan, and tyrosine.

The β-amino acid may be, for example, β-alanine.

The γ-amino acid may be, for example, γ-aminobutyric acid.

Z represents a hydrogen atom or an alkyl group having 1 to 6 carbon atoms. The alkyl group having 1 to 6 carbon atoms is optionally substituted with a substituent selected from the group consisting of a carboxyl group, an amino group, a hydroxy group, a guanidyl group, a pyridine ring, and an imidazole ring.

p represents an integer of 1 to 5. Preferably, p represents an integer of 2 to 4.

q represents an integer of 1 to 3. Preferably, q represents 1 or 2.

However, p and q are not simultaneously 1.

If p is 2 or more, $L^1$-Xaa-$L^2$ moieties may be the same or different. If q is 2 or more, $[(L^1\text{-Xaa-}L^2)_p\text{-Z}]$ moieties may be the same or different.

Particularly preferably, the organic compound used in the present invention is a compound represented by the following formula (2), (3), (4), (5), or (6). According to the present invention, there is provided a compound represented by the following formula (2), (3), (4), (5), or (6):

(2)

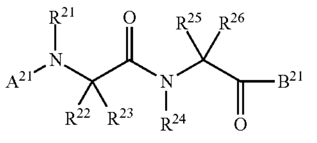

where $A^{21}$ represents a group having an absorption spectrum in the ultraviolet, visible, or near-infrared region, $R^{21}$ to $R^{26}$ represent a hydrogen atom or a substituent, provided that at least one of the substituents represented by $R^{21}$ to $R^{26}$ has a thiol group, and at least one of the substituents represented by $R^{21}$ to $R^{26}$ has an amino group, and $B^{21}$ represents a hydroxy group, an amino group, an α-amino acid residue, a β-amino acid residue, a γ-amino acid residue, or a peptide residue, (3)

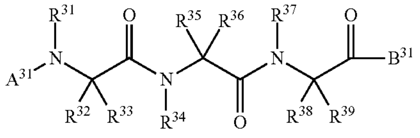

where $A^{31}$ represents a group having an absorption spectrum in the ultraviolet, visible, or near-infrared region, $R^{31}$ to $R^{39}$ represent a hydrogen atom or a substituent, provided that the substituents represented by $R^{31}$ to $R^{39}$ include one thiol group and one amino group, and $B^{31}$ represents a hydroxy group, an amino group, an α-amino acid residue, a β-amino acid residue, a γ-amino acid residue, or a peptide residue, (4)

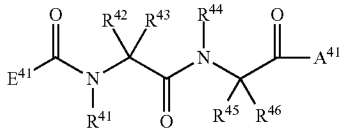

where $A^{41}$ represents a group having an absorption spectrum in the ultraviolet, visible, or near-infrared region, $R^{41}$ to $R^{46}$ represent a hydrogen atom or a substituent, provided that at least one of the substituents represented by $R^{41}$ to $R^{46}$ has a thiol group, and at least one of the substituents represented by $R^{41}$ to $R^{46}$ has an amino group, and $E^{41}$ represents an alkyl group having 1 to 6 carbon atoms that is optionally substituted with a substituent selected from the group consisting of a carboxyl group, an amino group, a hydroxy group, a guanidyl group, a pyridine ring, and an imidazole ring, (5)

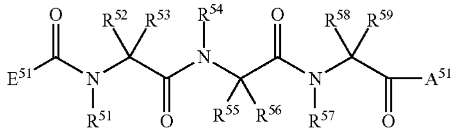

where $A^{51}$ represents a group having an absorption spectrum in the ultraviolet, visible, or near-infrared region, $R^{51}$ to $R^{59}$ represent a hydrogen atom or a substituent, provided that at least one of the substituents represented by $R^{51}$ to $R^{59}$ has a thiol group, and at least one of the substituents represented by $R^{51}$ to $R^{59}$ has an amino group, and $E^{51}$ represents an alkyl group having 1 to 6 carbon atoms that is optionally substituted with a substituent selected from the group consisting of a carboxyl group, an amino group, a hydroxy group, a guanidyl group, a pyridine ring, and an imidazole ring, (6)

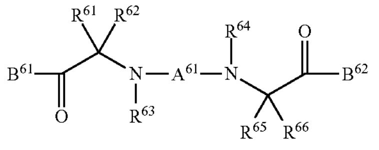

where $A^{61}$ represents a group having an absorption spectrum in the ultraviolet, visible, or near-infrared region, $R^{61}$ to $R^{66}$ represent a hydrogen atom or a substituent, provided that at least one of the substituents represented by $R^{61}$ to $R^{66}$ has a thiol group, and at least one of the substituents represented by $R^{61}$ to $R^{66}$ has an amino group, and $B^{61}$ and $B^{62}$ each independently represent a hydroxy group, an amino group, an α-amino acid residue, a β-amino acid residue, a γ-amino acid residue, or a peptide residue.

The groups having an absorption spectrum in the ultraviolet, visible, or near-infrared region in formulas (2) to (6) are preferably groups having a naphthalene ring structure.

$A^{21}$ in formula (2) and $A^{31}$ in formula (3) are preferably any of:

(A)

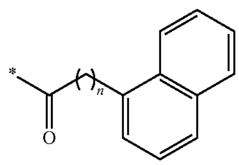

(B)

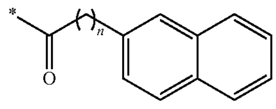

$A^{41}$ in formula (4) and $A^{51}$ in formula (5) are preferably any of:

(C)

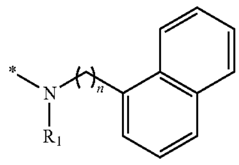

(D)

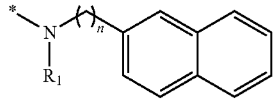

$A^{61}$ in formula (6) is preferably:

(F)

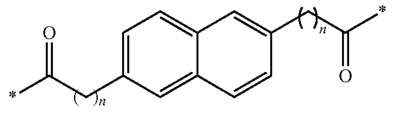

In the above formulas, $R_1$ represents a hydrogen atom or an alkyl group having 1 to 6 carbon atoms, n represents an integer of 0 to 3, and * represents a linking site.

In formula (2), $R^{21}$ to $R^{26}$ represent a hydrogen atom or a substituent.

In formula (3), $R^{31}$ to $R^{39}$ represent a hydrogen atom or a substituent.

In formula (4), $R^{41}$ to $R^{46}$ represent a hydrogen atom or a substituent.

In formula (5), $R^{51}$ to $R^{59}$ represent a hydrogen atom or a substituent.

In formula (6), $R^{61}$ to $R^{66}$ represent a hydrogen atom or a substituent, The substituents represented by $R^{21}$ to $R^{26}$, $R^{31}$ to $R^{39}$, $R^{41}$ to $R^{46}$, $R^{51}$ to $R^{59}$, and $R^{61}$ to $R^{66}$ may be, but is not limited to, an alkyl group having 1 to 6 carbon atoms, an alkyl group having 1 to 6 carbon atoms that is substituted with a hydroxy group, an alkyl group having 1 to 6 carbon atoms that is substituted with a carboxyl group, an alkyl group having 1 to 6 carbon atoms that is substituted with $-CONH_2$, an alkyl group having 1 to 6 carbon atoms that is substituted with an amino group ($-NH_2$), an alkyl group having 1 to 6 carbon atoms that is substituted with a thiol group (—SH), an alkyl group having 1 to 6 carbon atoms that is substituted with $-S-CH_3$, or an alkyl group having 1 to 6 carbon atoms that is substituted with any of:

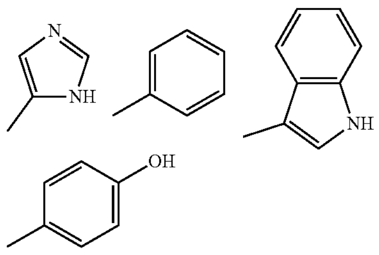

If any of $R^{22}$, $R^{23}$, $R^{25}$, $R^{26}$, $R^{32}$, $R^{33}$, $R^{35}$, $R^{36}$, $R^{38}$, $R^{39}$, $R^{42}$, $R^{43}$, $R^{45}$, $R^{46}$, $R^{52}$, $R^{53}$, $R^{55}$, $R^{56}$, $R^{58}$, $R^{59}$, $R^{61}$, $R^{62}$, $R^{65}$, and $R^{66}$ represents an alkyl group having 1 to 6 carbon atoms, the alkyl group may be attached to the adjacent N atom to form a ring.

Preferably, $R^{21}$ and $R^{24}$ are hydrogen atoms.

Preferably, one of $R^{22}$ and $R^{23}$ is a hydrogen atom, and the other is the substituent described above.

Preferably, one of $R^{25}$ and $R^{26}$ is a hydrogen atom, and the other is the substituent described above.

Preferably, $R^{31}$, $R^{34}$, and $R^{37}$ are hydrogen atoms.

Preferably, one of $R^{32}$ and $R^{33}$ is a hydrogen atom, and the other is the substituent described above.

Preferably, one of $R^{35}$ and $R^{36}$ is a hydrogen atom, and the other is the substituent described above.

Preferably, one of $R^{38}$ and $R^{39}$ is a hydrogen atom, and the other is the substituent described above.

Preferably, $R^{41}$ and $R^{44}$ are hydrogen atoms.

Preferably, one of $R^{42}$ and $R^{43}$ is a hydrogen atom, and the other is the substituent described above.

Preferably, one of $R^{45}$ and $R^{46}$ is a hydrogen atom, and the other is the substituent described above.

Preferably, $R^{51}$, $R^{54}$, and $R^{57}$ are hydrogen atoms.

Preferably, one of $R^{52}$ and $R^{53}$ is a hydrogen atom, and the other is the substituent described above.

Preferably, one of $R^{55}$ and $R^{56}$ is a hydrogen atom, and the other is the substituent described above.

Preferably, one of $R^{58}$ and $R^{59}$ is a hydrogen atom, and the other is the substituent described above.

Preferably, $R^{63}$ and $R^{64}$ are hydrogen atoms.

Preferably, one of $R^{61}$ and $R^{62}$ is a hydrogen atom, and the other is the substituent described above.

Preferably, one of $R^{65}$ and $R^{66}$ is a hydrogen atom, and the other is the substituent described above.

The α-amino acid residues, the β-amino acid residues, and the γ-amino acid residues in formulas (2) to (6) are as described above for the amino acid residue represented by Xaa.

The peptide residues in formulas (2) to (6) may be those composed of two or more amino residues (where the amino acid residues may be an α-amino acid residue, a β-amino acid residue, or a γ-amino acid residue).

In the present specification, examples of alkyl groups having 1 to 6 carbon atoms include methyl, ethyl, propyl, isopropyl, butyl, isobutyl, sec-butyl, tert-butyl, pentyl, isopentyl, neopentyl, tert-pentyl, hexyl, and cyclopropyl groups.

The organic compound used in the present invention can be manufactured by a known peptide synthesis method. Specifically, the organic compound can be manufactured in accordance with the method described later in the Examples section. That is, the organic compound used in the present invention can be synthesized by solid-phase peptide synthesis using a commercially available automated peptide synthesizer.

Synthesis can be performed by setting to the synthesizer a resin for solid-phase synthesis, N-methyl-2-pyrrolidone (NMP) solutions of Fmoc-amino acids, an NMP solution of ethyl cyano-hydroxyimino-acetate, an NMP solution of diisopropylethylamine, an NMP solution of diisopropylcarbodiimide, an NMP solution of piperidine, and an NMP solution of acetic anhydride. One cycle includes Fmoc deprotection, washing with NMP, Fmoc-amino acid condensation, and washing with NMP. By repeating this cycle, a peptide chain can be extended.

The skin sensitization measuring reagent according to the present invention may be composed only of the organic compound or may include one or more additives in addition to the organic compound serving as the main measuring agent. Examples of additives include pH adjusters and stabilizers. The skin sensitization measuring reagent according to the present invention may be prepared by dissolving the main measuring agent and optionally the additives in water, an aqueous buffer solution, an organic solvent, or a mixture thereof.

The skin sensitization measuring reagent according to the present invention may be provided in solution form, in liquid form, or in solid form (e.g., powders, granules, freeze-dried products, or tablets).

A method for measuring skin sensitization according to the present invention includes:

(1) reacting the skin sensitization measuring reagent according to the present invention with a test substance; and (2) determining the amount of the skin sensitization measuring reagent after the reaction or the amount of a product of the reaction by an optical measurement.

For example, the skin sensitization measuring reagent according to the present invention may be used in a form in which the skin sensitization measuring reagent is dissolved in an aqueous buffer solution such as a phosphate buffer solution or an organic solvent such as dimethyl sulfoxide (DMSO) and is optionally further diluted with an aqueous buffer solution such as a phosphate buffer solution or another organic solvent, for example, at an organic compound concentration of about 0.01 μmol/L to about 1 mol/L, typically about 1 μmol/L to about 100 μmol/L.

Although the type of test substance is not particularly limited, the test substance is, for example, at least one of a perfume, an essential oil, a polymer compound, a medicine, an agricultural chemical, food, a chemical product, or a plant extract made of a naturally derived component. For example, the test substance may be dissolved in an organic solvent such as methanol, ethanol, acetonitrile, acetone, or a mixture thereof, for example, at a concentration of about 0.01 μmol/L to about 1 mol/L, typically about 0.1 mmol/L to about 500 mmol/L.

The organic compound serving as the main measuring agent of the skin sensitization measuring reagent according to the present invention may be mixed and reacted with a test substance solution such that the ratio of the molar concentration of the organic compound to the molar concentration of the test substance is, for example, 1:100 to 10:1. The reaction can be performed by stirring a solution including the organic compound and the test substance or allowing the solution to stand, typically for about 1 minute to about 2 days, while maintaining the solution in the temperature range of, for example, about 4° C. to about 60° C.

The skin sensitization of the test substance can be measured by examining the reactivity of the organic compound with the test substance by the above reaction. To examine the reactivity, the mixture of the skin sensitization measuring reagent solution and the test substance solution may be analyzed for the amount of residual organic compound and/or the amount of the reaction product of the organic compound with the test substance. This analysis is performed over time to determine the reaction rate constant of the organic compound for the test substance. The skin sensitization of the test substance can be evaluated by comparing the reaction rate constants of different test substances or by comparing the reaction rate constant of the test substance with the reaction rate constant determined for a compound that has been examined for the presence or absence or strength of skin sensitization by animal testing.

If the skin sensitization measuring reagent can undergo any change in the reaction solution during the analysis of the amount of residual organic compound, a reaction solution from which only the test substance is excluded (control group) may optionally be separately prepared and analyzed, and correction may be made based on the amount of residual organic compound in this reaction solution.

The method according to the present invention may include chromatographing the reaction product obtained by the step of reacting the skin sensitization measuring reagent with the test substance. That is, although the method for analyzing the compound and the compound produced by the reaction is not particularly limited, the compound produced by the reaction, the organic compound, and the test substance can be separated and analyzed by a technique such as high-performance liquid chromatography (HPLC), gas chromatography (GC), or thin layer chromatography (TLC).

Examples of chromatography techniques that can be used for HPLC, GC, or TLC include reversed-phase chromatography, normal-phase chromatography, and ion-exchange chromatography. Examples of commercially available columns and TLC plate that can be used for such chromatography techniques include LC columns such as CAPCELL-PAK (manufactured by Shiseido Co., Ltd.), L-column ODS (manufactured by Chemicals Evaluation and Research Institute, Japan), and Shodex Asahipak (manufactured by Showa Denko K.K.); and TLC plates such as Silica Gel 60 F254 (manufactured by Merck) and Silica Gel Plate (manufactured by Nacalai Tesque, Inc.).

Although the method for detecting the compound produced by the reaction or the residual organic compound is not particularly limited, examples of detectors that can be used for the HPLC analysis include ultraviolet-visible detectors, near-infrared detectors, fluorescence detectors, refractive index detectors, conductivity detectors, and evaporative light scattering detectors. Examples of ultraviolet-visible detectors include single-wavelength ultraviolet-visible detectors, dual-wavelength ultraviolet-visible detectors, and photodiode array detectors. Examples of commercially available detectors that can be used for such detection methods include ultraviolet-visible detectors, refractive index detectors, and conductivity detectors such as those manufactured by Shimadzu Corporation, Hitachi, Ltd., Waters Corporation, and Shiseido Co., Ltd. and evaporative light scattering detectors such as those manufactured by Shimadzu Corporation.

In the present invention, the optical measurement is preferably performed using a fluorescence detector, more preferably at an excitation wavelength of 200 to 350 nm and a fluorescence wavelength of 200 to 400 nm.

The detection in the method for measurement using the skin sensitization measuring reagent according to the present invention is not limited to the above, but may be performed by, for example, detecting ions with a particular mass based on molecular weight in accordance with the method described in JP2003-14761A or JP2008-139275A.

In the method using the skin sensitization measuring reagent according to the present invention, an optical detection method can preferably be used. Preferably, an ultraviolet-visible detector or a near-infrared detector as mentioned above may be used.

The present invention will now be specifically described with reference to the following examples, although these examples are not intended to limit the present invention.

EXAMPLES

Explanation of Terms

EDTA: ethylenediaminetetraacetic acid
NAC: N-[2-(naphthalen-1-yl)acetyl]cysteine
NAL: α-N-[2-(naphthalen-1-yl)acetyl]lysine
TFA: trifluoroacetic acid
DMSO: dimethyl sulfoxide

Test Method

(1) Preparation of Various Solutions

(1-1) 0.1 mmol/L EDTA Aqueous Solution

1) Into a 15 mL conical tube, 37.2 mg of EDTA.2Na.2$H_2$O (manufactured by Dojindo Laboratories) is weighed, and the compound is dissolved by adding 10 mL of distilled water (manufactured by Hikari Pharmaceutical Co., Ltd., water for injection (Japanese Pharmacopoeia)) using a 25 mL measuring pipette (10 mmol/L EDTA aqueous solution).

2) To a 100 mL container, 49.5 mL of distilled water (manufactured by Hikari Pharmaceutical Co., Ltd., water for injection (Japanese Pharmacopoeia)) is added using a 50 mL measuring pipette, and 0.5 mL of the 10 mmol/L EDTA aqueous solution in 1) above is added and mixed so that the solution is diluted 100-fold (0.1 mmol/L EDTA aqueous solution).

(1-2) 100 Mmol/L Phosphate Buffer Solution (pH 8.0)

1) Into a 100 mL container, 0.6 g of anhydrous sodium dihydrogen phosphate (manufactured by FUJIFILM Wako Pure Chemical Corporation, Special Grade) is weighed, and the compound is dissolved by adding 50 mL of distilled water (manufactured by Hikari Pharmaceutical Co., Ltd., water for injection (Japanese Pharmacopoeia)) using a 50 mL measuring pipette.

2) To a 500 mL container, 300 mL of distilled water (manufactured by Hikari Pharmaceutical Co., Ltd., water for injection (Japanese Pharmacopoeia)) is added using a 50 mL (or 100 mL) measuring pipette.

3) After 4.26 g of anhydrous disodium hydrogen phosphate (manufactured by FUJIFILM Wako Pure Chemical Corporation, Special Grade) is weighed, the compound is added and dissolved into the distilled water (manufactured by Hikari Pharmaceutical Co., Ltd., water for injection (Japanese Pharmacopoeia)) in 2).

4) To the anhydrous disodium hydrogen phosphate solution in 3), 16 mL of the anhydrous sodium dihydrogen phosphate solution in 1) is added using a 25 mL measuring pipette.

5) Using a 25 mL measuring pipette, 17 mL of the solution in 4) is removed, and 1 mL of the 0.1 mmol/L EDTA aqueous solution is added to the remainder in 4) to a volume of 300 mL. The concentration of EDTA in this solution is 0.33 μmol/L, and the concentration of EDTA in a reaction solution is 0.25 μmol/L.

6) A portion of the solution is collected into another container, and the pH is measured using a pH meter to confirm that the pH is within the range of 7.9 to 8.1.

(1-3) Reaction Stop Solution (2.5% (v/v) TFA Aqueous Solution)

To 100 mL of distilled water (manufactured by FUJIFILM Wako Pure Chemical Corporation), 2.5 mL of TFA (manufactured by FUJIFILM Wako Pure Chemical Corporation, Special Grade) is added.

(1-4) HPLC Mobile Phase A: 0.1% (v/v) TFA Aqueous Solution

To 1 L of distilled water (manufactured by FUJIFILM Wako Pure Chemical Corporation), 1.0 mL of TFA is added.

(1-5) HPLC Mobile Phase B: 0.1% (v/v) TFA Acetonitrile Solution

To 1 L of HPLC-grade acetonitrile (manufactured by FUJIFILM Wako Pure Chemical Corporation, for HPLC), 1.0 mL of TFA is added.

(2) Preparation of Nucleophilic Reagent Stock Solution

The same stock solution is used for one test. The stock solution is stored in portions that can be used up for each test. A specific example of preparation is given below:

1) A nucleophilic reagent is dissolved in DMSO (manufactured by FUJIFILM Wako Pure Chemical Corporation) depending on its molecular weight to prepare a 2 mmol/L nucleophilic reagent solution.

2) To a 500 mL container, 149.5 mL of the buffer solution is added using a 50 mL measuring pipette, and 0.5 mL of the 2 mmol/L nucleophilic reagent solution is added and mixed by inversion so that the solution is diluted 300-fold (6.667 μmol/L). This solution is stored in a freezer at −70° C. or lower.

(3) Preparation of Test Substance Solution

One solvent with which a 1 mmol/L test substance solution can be prepared is selected according to the following order of priority: water, acetonitrile, acetone, and a 5% solution of DMSO in acetonitrile. If water, acetonitrile, or acetone is selected, a 20 mmol/L test substance solution is first prepared. A suitable amount of the test substance is weighed and completely dissolved by adding the solvent to prepare a 20 mmol/L solution. A portion of the 20 mmol/L solution is then collected and diluted 20-fold with the same solvent to prepare a 1 mmol/L test substance solution. If a 5% by mass solution of DMSO in acetonitrile is selected, a 20 mmol/L test substance solution is prepared in the same manner as above. A portion of the solution is then collected and diluted 20-fold with acetonitrile to prepare a 1 mmol/L test substance solution.

(4) Reaction (4-1) Addition

Test substance solutions are prepared on a 96-well plate (U96 PP-0.5 ML NATURAL, Thermo (NUNC)), mainly using a 12-channel pipette, and the reagent is added in the following amount:

Nucleophilic reagent: 150 μL

Test substance solution: 50 μL (4-2) Reaction

The plate is firmly sealed with a plate seal (resistant embossed seal (TORAST™ 96-well Seal E Type (TORAST is a registered trademark)), Shimadzu GLC Ltd.) and is shaken on a plate shaker (Titramax 100, Heidolph Instruments). After being spun down in a centrifuge, the reaction solutions are incubated at 25° C. in a light-shielded state for 24 hours.

(4-3) Reaction Stop

After incubation for 24 hours, the plate seal is removed, and 50 μL of the reaction stop solution is added to each sample to stop the reaction.

(5) HPLC Measurement

The HPLC measurement conditions for the nucleophilic reagents are given below. As the elution conditions, condition 1, 2 or 3 was selected depending on the nucleophilic reagent.

TABLE 1

| | |
|---|---|
| HPLC instrument | LC-20A (Prominence) series (Shimadzu Corporation) |
| Column | Wakopak (registered trademark) Core C18 ADRA Column (3.0 × 150 mm, 2.6 μm) (FUJIFILM Wako Pure Chemical Corporation) |
| Detector | UV detection: SPD-M20A (Shimadzu Corporation) Fluorescence detection: RF10AXL (Shimadzu Corporation) |
| Detection wavelength | UV detection: 281 nm Fluorescence detection: 284 nm (excitation), 333 nm (fluorescence) |
| Column temperature | 40° C. |
| Sample temperature | 25° C. |
| Injection volume | 10-20 μL |
| Eluent | A: water (0.1% trifluoroacetic acid) B: acetonitrile (0.1% trifluoroacetic acid) |
| Measurement time | 20 minutes |

Elution conditions

| Time (min) | Flow rate (mL/min) | % A | % B |
|---|---|---|---|
| Condition 1 | | | |
| 0.0 | 0.3 | 70 | 30 |
| 9.5 | 0.3 | 45 | 55 |
| 10.0 | 0.3 | 0 | 100 |
| 13.0 | 0.3 | 0 | 100 |
| 13.5 | 0.3 | 70 | 30 |
| 20.0 | End | | |

TABLE 1-continued

| Time (min) | Flow rate (mL/min) | % A | % B |
|---|---|---|---|
| Condition 2 | | | |
| 0.0 | 0.3 | 80 | 20 |
| 9.5 | 0.3 | 55 | 45 |
| 10.0 | 0.3 | 0 | 100 |
| 13.0 | 0.3 | 0 | 100 |
| 13.5 | 0.3 | 80 | 20 |
| 20.0 | End | | |
| Condition 3 | | | |
| 0.0 | 0.3 | 90 | 10 |
| 9.5 | 0.3 | 55 | 45 |
| 10.0 | 0.3 | 0 | 100 |
| 13.0 | 0.3 | 0 | 100 |
| 13.5 | 0.3 | 90 | 10 |
| 20.0 | End | | |

(6) Data Analysis (6-1) Calculation of Depletion

The depletion of the nucleophilic reagent is calculated from the mean peak area of the nucleophilic reagent by the following equation:

$$\text{Depletion of nucleophilic reagent(\% depletion)} = [1 - (\text{peak area of unreacted nucleophilic reagent after reaction} / \text{standard mean peak area of nucleophilic reagent})] \times 100$$

(7) Evaluation Items (7-1) Stability of Nucleophilic Reagent (Particularly, Degree of Oxidation of Cysteine)

The reaction solution as prepared (0 hours) and the reaction solution incubated at 25° C. for 24 hours (24 hours) are each subjected to measurement by HPLC-UV. Because the nucleophilic reagent and oxidized nucleophilic reagent can be identified on the HPLC, the residual fraction of the nucleophilic reagent is calculated based on the following equation:

$$\text{Residual fraction of nucleophilic reagent(\%)} = \text{area of nucleophilic reagent} / (\text{area of nucleophilic reagent} + \text{area of oxidized nucleophilic reagent}) \times 100$$

(7-2) Fluorescence Detection Sensitivity of Nucleophilic Reagent

In fluorescence detection, the peak area detected with excitation light (284 nm) and fluorescence (333 nm) is determined. This value is compared with those of NAC and NAL described in Patent Literatures 1 and 2.

(7-3) Evaluation of Reactivity with Sensitizers

Ten substances shown in the following table were used for reactivity evaluation. For primary evaluation, the upper three substances were used. The substances selected for the primary evaluation were a substance that mainly reacts with cysteine, a substance that mainly reacts with lysine, and a substance that does not react. For secondary evaluation, the lower seven substances were used. The substances selected for the secondary evaluation were substances that are difficult to distinguish between sensitizers and non-sensitizers by analysis using NAC and NAL. As above, the substances selected for the secondary evaluation were five substances that mainly react with cysteine and two substances that mainly react with lysine.

TABLE 2

| No. | Evaluation substance | CAS | Molecular weight | Purity (%) | Skin sensitization | Solvent used |
|---|---|---|---|---|---|---|
| | | | Primary evaluation substance | | | |
| 1 | Trimellitic anhydride (FUJIFILM Wako Pure Chemical Corporation) | 552-30-7 | 192.13 | 97 | Strong sensitizer (mainly react with lysine) | Acetonitrile |
| 2 | 2-Methyl-2H-isothiazol-3-one (Sigma-Aldrich) | 2682-20-4 | 115.15 | 95 | Moderate sensitizer (mainly react with cysteine) | Acetonitrile |
| 3 | Salicylic acid (FUJIFILM Wako Pure Chemical Corporation) | 69-72-7 | 138.12 | 99.5 | Non-sensitizer | Acetonitrile |
| | | | Secondary evaluation substance | | | |
| 4 | Diphenylcyclopropenone (FUJIFILM Wako Pure Chemical Corporation) | 886-38-4 | 206.24 | 98 | Strong sensitizer (mainly react with cysteine) | Acetonitrile |
| 5 | Nonanoyl chloride (Tokyo Chemical Industry Co., Ltd.) | 764-85-2 | 176.68 | 97 | Moderate sensitizer (mainly react with lysine) | Acetonitrile |
| 6 | Cyclamen aldehyde (Sigma-Aldrich) | 103-95-7 | 190.28 | 92 | Strong sensitizer (mainly react with cysteine) | Acetonitrile |
| 7 | Imidazolidinyl urea (Sigma-Aldrich) | 39236-46-9 | 388.29 | 100 | Strong sensitizer (mainly react with cysteine) | Water |
| 8 | 5-Methyl-2,3-hexanedione (Tokyo Chemical Industry Co., Ltd.) | 13706-86-0 | 128.17 | 94 | Weak sensitizer (mainly react with lysine) | Acetonitrile |
| 9 | Ethylene glycol dimethacrylate (FUJIFILM Wako Pure Chemical Corporation) | 97-90-5 | 198.22 | 97 | Strong sensitizer (mainly react with cysteine) | Acetonitrile |
| 10 | Hydroxycitronellal (FUJIFILM Wako Pure Chemical Corporation) | 107-75-5 | 172.26 | 95 | Strong sensitizer (mainly react with cysteine) | Acetonitrile |

The reactivity was compared with the depletions of NAC and NAL or the mean depletion (mean % depletion).

Example 1

The synthesis route and yield of the nucleophilic reagent according to the present invention are shown.

General Method for Solid-Phase Peptide Synthesis Using Automated Peptide Synthesizer Solid-phase peptide synthesis was performed using an automated peptide synthesizer (Syro I manufactured by Biotage). Synthesis was performed by setting to the synthesizer a resin for solid-phase synthesis, N-methyl-2-pyrrolidone (NMP) solutions of Fmoc-amino acids (0.5 mol/L), an NMP solution of ethyl cyano-hydroxyimino-acetate (1 mol/L), an NMP solution of diisopropylethylamine (0.1 mol/L), an NMP solution of diisopropylcarbodiimide (1 mol/L), an NMP solution of piperidine (20% v/v), and an NMP solution of acetic anhydride (20% v/v).

One cycle included Fmoc deprotection (20 minutes), washing with NMP, Fmoc-amino acid condensation (1 hour), and washing with NMP. By repeating this cycle, a peptide chain was extended.

The resulting crude product was purified by liquid chromatography.

Column: X Select CSH Prep C18 5 μm OBD (19×250 mm) manufactured by Waters Corporation Column temperature: 40° C.

Flow rate: 20 mL/min

Detection wavelength: 220 nm, 254 nm

Solvent: Liquid A: 0.1% formic acid-water; Liquid B: 0.1% formic acid-acetonitrile The Fmoc-amino acids were obtained from Watanabe Chemical Industries, Ltd.

N-Methyl-2-pyrrolidone, diisopropylethylamine, diisopropylcarbodiimide, piperidine, and acetic anhydride were obtained from FUJIFILM Wako Pure Chemical Corporation.

Ethyl cyano-hydroxyimino-acetate was obtained from Tokyo Chemical Industry Co., Ltd.

Compound 1

Solid-phase peptide synthesis was performed using 4-Fmoc hydrazinebenzoyl AM NovaGel (manufactured by Novabiochem) (0.61 mmol/g, 131 mg) as a resin for solid-phase synthesis.

(S)-2-((((9H-Fluoren-9-yl)methoxy)carbonyl)amino)-N-ε-(tert-butoxycarbonyl)-L-lysine (Fmoc-Lys(Boc)-OH), (S)-2-((((9H-fluoren-9-yl)methoxy)carbonyl)amino)-S-trityl-L-cysteine (Fmoc-Cys(Trt)-OH), and acetic anhydride were condensed in that order. After completion of extension, the resin was washed with dichloromethane (manufactured by FUJIFILM Wako Pure Chemical Corporation), and 800 μL of dimethylformamide (DMF) (manufactured by FUJIFILM Wako Pure Chemical Corporation), 7.4 mg of copper (II) acetate (manufactured by FUJIFILM Wako Pure Chemical Corporation), 130 μL of pyridine (manufactured by FUJIFILM Wako Pure Chemical Corporation), and 80 μL of 1-naphthylmethylamine (manufactured by Alfa Aesar) were added, followed by shaking for 18 hours. The resin was filtered out and washed twice with 1 mL of ethyl acetate (manufactured by FUJIFILM Wako Pure Chemical Corporation). To the filtrate was added 1 mL of 1 mol/L hydrochloric acid (manufactured by FUJIFILM Wako Pure Chemical Corporation). After thorough mixing, the mixture was allowed to stand, and the ethyl acetate layer was recovered. The solvent was then removed by distillation under reduced pressure. A solid was formed by adding 2 mL of trifluoroacetic acid (TFA) (manufactured by FUJIFILM Wako Pure Chemical Corporation):triisopropylsilane (manufactured by Tokyo Chemical Industry Co., Ltd.): water (=95:2.5:2.5) and adding 12 mL of n-hexane (manufactured by FUJIFILM Wako Pure Chemical Corporation)): methyl t-butyl ether (manufactured by FUJIFILM Wako Pure Chemical Corporation) (=1:1). After the solid was settled by centrifugation, the supernatant was removed. After the solid was washed with methyl t-butyl ether (manufactured by FUJIFILM Wako Pure Chemical Corporation), the solvent was removed by distillation under reduced pressure. After the resulting residue was purified by liquid chromatography, the solvent was removed by distillation under reduced pressure, followed by freeze drying to yield 2.4 mg of a white solid.

1H-NMR (DMSO-d6) δ: 8.52-8.08 (4H, m), 8.06-7.97 (1H, m), 7.97-7.90 (1H, m), 7.90-7.80 (1H, m), 7.58-7.50 (1H, m), 7.47-7.39 (2H, m), 4.77-4.70 (2H, m), 4.64-4.22 (2H, m), 3.8-3.0 ($H_2O$), 2.76-2.57 (4H, m), 2.30-2.23 (1H, m), 1.90-1.83 (3H, m), 1.77-1.15 (6H, m)

Compounds 2 to 14

Compounds 2 to 14 were synthesized in the same manner as Compound 1. The reagents used for solid-phase peptide synthesis were changed as in the following table.

TABLE 3

| Compound | Step 1 | Step 2 | Step 3 | Step 4 |
|---|---|---|---|---|
| Compound 1 | Fmoc-Lys(Boc)-OH | Fmoc-Cys(Trt)-OH | Acetic anhydride | None |
| Compound 2 | Fmoc-Cys(Trt)-OH | Fmoc-Lys(Boc)-OH | Acetic anhydride | None |
| Compound 3 | Fmoc-Asp(O$^t$Bu)-OH | Fmoc-Cys(Trt)-OH | Fmoc-Lys(Boc)-OH | Acetic anhydride |
| Compound 4 | Fmoc-Asp(O$^t$Bu)-OH | Fmoc-Lys(Boc)-OH | Fmoc-Cys(Trt)-OH | Acetic anhydride |
| Compound 5 | Fmoc-Lys(Boc)-OH | Fmoc-Cys(Trt)-OH | Fmoc-Asp(O$^t$Bu)-OH | Acetic anhydride |
| Compound 6 | Fmoc-Ala-OH | Fmoc-Cys(Trt)-OH | Fmoc-Lys(Boc)-OH | Acetic anhydride |
| Compound 7 | Fmoc-Ser(O$^t$Bu)-OH | Fmoc-Cys(Trt)-OH | Fmoc-Lys(Boc)-OH | Acetic anhydride |
| Compound 8 | Fmoc-His(Boc)-OH | Fmoc-Cys(Trt)-OH | Fmoc-Lys(Boc)-OH | Acetic anhydride |
| Compound 9 | Fmoc-Arg(Pbf)-OH | Fmoc-Cys(Trt)-OH | Fmoc-Lys(Boc)-OH | Acetic anhydride |
| Compound 10 | Fmoc-Glu(O$^t$Bu)-OH | Fmoc-Cys(Trt)-OH | Fmoc-Lys(Boc)-OH | Acetic anhydride |
| Compound 11 | Fmoc-Asp(O$^t$Bu)-OH | Fmoc-Lys(Boc)-OH | Fmoc-Cys(Trt)-OH | Succinic anhydride |
| Compound 12 | Fmoc-His(Boc)-OH | Fmoc-Cys(Trt)-OH | Fmoc-Lys(Boc)-OH | Succinic anhydride |
| Compound 13 | Fmoc-Asp(O$^t$Bu)-OH | Fmoc-Lys(Boc)-OH | Fmoc-Cys(Trt)-OH | Glycolic acid |
| Compound 14 | Fmoc-His(Boc)-OH | Fmoc-Cys(Trt)-OH | Fmoc-Lys(Boc)-OH | Glycolic acid |

Succinic anhydride and glycolic acid were obtained from FUJIFILM Wako Pure Chemical Corporation.

Compound 15

Solid-phase peptide synthesis was performed using Rink Amide-ChemMatrix (manufactured by Biotage) (0.45 mmol/g, 177.8 mg) as a resin for solid-phase synthesis.

(S)-2-((((9H-Fluoren-9-yl)methoxy)carbonyl)amino)-N-ε-(tert-butoxycarbonyl)-L-lysine (Fmoc-Lys(Boc)-OH), (S)-2-((((9H-fluoren-9-yl)methoxy)carbonyl)amino)-S-trityl-L-cysteine (Fmoc-Cys(Trt)-OH), (S)-2-((((9H-fluoren-9-yl)methoxy)carbonyl)amino)-O-tert-butyl-L-tyrosine (Fmoc-Tyr(O'Bu)-OH), and 2-naphthylacetic acid (manufactured by FUJIFILM Wako Pure Chemical Corporation) were condensed in that order. After completion of extension, the resin was washed with dichloromethane (manufactured by FUJIFILM Wako Pure Chemical Corporation), and the solvent was then then removed by distillation under reduced pressure. By adding 2 mL of trifluoroacetic acid (TFA) (manufactured by FUJIFILM Wako Pure Chemical Corporation):triisopropylsilane (manufactured by Tokyo Chemical Industry Co., Ltd.):water (=95:2.5:2.5), the peptide was cleaved from the resin while deprotection was simultaneously performed. After 2 hours, the resin was filtered out, and 12 mL of n-hexane (manufactured by FUJIFILM Wako Pure Chemical Corporation):methyl t-butyl ether (manufactured by FUJIFILM Wako Pure Chemical Corporation) (=1:1) was added to the filtrate to form a solid. After the solid was settled by centrifugation, the supernatant was removed. After the solid was washed with methyl t-butyl ether (manufactured by FUJIFILM Wako Pure Chemical Corporation), the solvent was removed by distillation under reduced pressure. After the resulting residue was purified by liquid chromatography, the solvent was removed by distillation under reduced pressure, followed by freeze drying to yield 5.9 mg of a white solid.

1H-NMR (DMSO-d6) δ: 8.46-8.30 (3H, m), 8.05-8.00 (1H, m), 7.88-7.72 (3H, m), 7.64-7.56 (1H, m), 7.52-7.00 (7H, m), 6.65-6.56 (2H, m), 4.55-4.33 (2H, m), 4.22-4.10 (1H, m), 3.8-3.0 ($H_2O$), 2.98-2.64 (5H, m), 1.77-1.21 (6H, m)

Compounds 16 to 19

Compounds 16 to 19 were synthesized in the same manner as Compound 15. The reagents used for solid-phase peptide synthesis were changed as in the following table.

TABLE 4

| Compound | Step 1 | Step 2 | Step 3 |
|---|---|---|---|
| Compound 15 | Fmoc-Lys(Boc)-OH | Fmoc-Cys(Trt)-OH | Fmoc-Tyr($O^t$Bu)-OH |
| Compound 16 | Fmoc-Lys(Boc)-OH | Fmoc-Cys(Trt)-OH | Fmoc-Ala(2Pyri)-OH |
| Compound 17 | Fmoc-Lys(Boc)-OH | Fmoc-Cys(Trt)-OH | Fmoc-Ala(4Pyri)-OH |
| Compound 18 | Fmoc-Lys(Boc)-OH | Fmoc-Cys(Trt)-OH | Fmoc-Phe-OH |
| Compound 19 | Fmoc-Lys(Boc)-OH | Fmoc-Cys(Trt)-OH | Fmoc-His(Boc)-OH |

Compound 20

Solid-phase peptide synthesis was performed using N-E-(t-butoxycarbonyl)-L-lysine 2-chlorotrityl resin (manufactured by Watanabe Chemical Industries, Ltd. (0.8 mmol/g, 100 mg) as a resin for solid-phase synthesis.

(S)-2-((((9H-Fluoren-9-yl)methoxy)carbonyl)amino)-S-trityl-L-cysteine (Fmoc-Cys(Trt)-OH), (S)-2-((((9H-fluoren-9-yl)methoxy)carbonyl)amino)-O-tert-butyl-L-tyrosine (Fmoc-Tyr(O’Bu)-OH), and 2-naphthylacetic acid (manufactured by FUJIFILM Wako Pure Chemical Corporation) were condensed in that order. After completion of extension, the resin was washed with dichloromethane (manufactured by FUJIFILM Wako Pure Chemical Corporation), and the solvent was then removed by distillation under reduced pressure. By adding 2 mL of trifluoroacetic acid (TFA) (manufactured by FUJIFILM Wako Pure Chemical Corporation):triisopropylsilane (manufactured by Tokyo Chemical Industry Co., Ltd.):water (=95:2.5:2.5), the peptide was cleaved from the resin while deprotection was simultaneously performed. After 2 hours, the resin was filtered out, and 12 mL of n-hexane (manufactured by FUJIFILM Wako Pure Chemical Corporation):methyl t-butyl ether (manufactured by FUJIFILM Wako Pure Chemical Corporation) (=1:1) was added to the filtrate to form a solid.

After the solid was settled by centrifugation, the supernatant was removed. After the solid was washed with methyl t-butyl ether (manufactured by FUJIFILM Wako Pure Chemical Corporation), the solvent was removed by distillation under reduced pressure. After the resulting residue was purified by liquid chromatography, the solvent was removed by distillation under reduced pressure, followed by freeze drying to yield 8.9 mg of a white solid.

1H-NMR (DMSO-d6) δ: 8.54-8.35 (3H, m), 7.90-7.71 (3H, m), 7.70-7.55 (2H, m), 7.51-7.40 (2H, m), 7.23 (1H, d, J=8.6 Hz), 7.05 (2H, d, J=7.9 Hz), 6.62 (2H, d, J=8.6 Hz), 4.58-4.45 (1H, m), 4.42-4.31 (1H, m), 3.91-3.80 (1H, m), 3.8-3.0 ($H_2O$), 3.04-2.95 (1H, m), 2.85-2.62 (4H, m), 1.80-1.17 (6H, m)

Compounds 21 to 31

Compounds 21 to 31 were synthesized in the same manner as Compound 20. The reagents used for solid-phase peptide synthesis were changed as in the following table.

TABLE 5

| Compound | Resin for solid-phase synthesis | Step 1 | Step 2 | Step 3 |
|---|---|---|---|---|
| Compound 20 | N-ε-(t-Butoxycarbonyl)-L-lysine 2-chlorotrityl resin (0.8 mmol/g 100 mg) | Fmoc-Cys(Trt)-OH | Fmoc-Tyr($O^t$Bu)-OH | 2-Naphthylacetic acid |
| Compound 21 | N-ε-(t-Butoxycarbonyl)-L-lysine 2-chlorotrityl resin (0.8 mmol/g 100 mg) | Fmoc-Cys(Trt)-OH | Fmoc-Ala(2Pyri)-OH | 2-Naphthylacetic acid |
| Compound 22 | N-ε-(t-Butoxycarbonyl)-L-lysine 2-chlorotrityl resin (0.8 mmol/g, 100 mg) | Fmoc-Cys(Trt)-OH | Fmoc-Ala(4Pyri)-OH | 2-Naphthylacetic acid |
| Compound 23 | N-ε-(t-Butoxycarbonyl)-L-lysine 2-chlorotrityl resin (0.8 mmol/g, 100 mg) | Fmoc-Cys(Trt)-OH | Fmoc-Phe-OH | 2-Naphthylacetic acid |
| Compound 24 | N-ε-(t-Butoxycarbonyl)-L-lysine 2-chlorotrityl resin (0.8 mmol/g, 100 mg) | Fmoc-Cys(Trt)-OH | Fmoc-His(Boc)-OH | 2-Naphthylacetic acid |
| Compound 25 | S-Trityl-L-cysteine 2-chlorotrityl resin (0.62 mmol/g, 80.6 mg) | Fmoc-Lys(Boc)-OH | Fmoc-Tyr($O^t$Bu)-OH | 2-Naphthylacetic acid |
| Compound 26 | S-Trityl-L-cysteine 2-chlorotrityl resin (0.62 mmol/g, 80.6 mg) | Fmoc-Lys(Boc)-OH | Fmoc-Ala(2Pyri)-OH | 2-Naphthylacetic acid |
| Compound 27 | S-Trityl-L-cysteine 2-chlorotrityl resin (0.62 mmol/g, 80.6 mg) | Fmoc-Lys(Boc)-OH | Fmoc-Ala(4Pyri)-OH | 2-Naphthylacetic acid |
| Compound 28 | S-Trityl-L-cysteine 2-chlorotrityl resin (0.62 mmol/g, 80.6 mg) | Fmoc-Lys(Boc)-OH | Fmoc-Phe-OH | 2-Naphthylacetic acid |
| Compound 29 | S-Trityl-L-cysteine 2-chlorotrityl resin (0.62 mmol/g, 80.6 mg) | Fmoc-Lys(Boc)-OH | Fmoc-His(Boc)-OH | 2-Naphthylacetic acid |
| Compound 30 | S-Trityl-L-cysteine 2-chlorotrityl resin (0.62 mmol/g, 80.6 mg) | Fmoc-Lys(Boc)-OH | 2-Naphthylacetic acid | None |
| Compound 31 | N-ε-(t-Butoxycarbonyl)-L-lysine 2-chlorotrityl resin (0.8 mmol/g, 100 mg) | Fmoc-Cys(Trt)-OH | 2-Naphthylacetic acid | None |

Compound 32

Solid-phase peptide synthesis was performed using S-Trityl-L-cysteine 2-chlorotrityl resin (manufactured by Watanabe Chemical Industries, Ltd. (0.62 mmol/g, 80.6 mg) as a resin for solid-phase synthesis.

(S)-2-((((9H-Fluoren-9-yl)methoxy)carbonyl)amino)-N-ε-(tert-butoxycarbonyl)-L-lysine (Fmoc-Lys(Boc)-OH), (S)-2-((((9H-fluoren-9-yl)methoxy)carbonyl)amino)-O-tert-butyl-L-tyrosine (Fmoc-Tyr(O'Bu)-OH), and 1-naphthylacetic acid (manufactured by FUJIFILM Wako Pure Chemical Corporation) were condensed in that order. After completion of extension, the resin was washed with dichloromethane (manufactured by FUJIFILM Wako Pure Chemical Corporation), and the solvent was then removed by distillation under reduced pressure. By adding 2 mL of trifluoroacetic acid (TFA) (manufactured by FUJIFILM Wako Pure Chemical Corporation):triisopropylsilane (manufactured by Tokyo Chemical Industry Co., Ltd.):water (=95:2.5:2.5), the peptide was cleaved from the resin while deprotection was simultaneously performed. After 2 hours, the resin was filtered out, and 12 mL of n-hexane (manufactured by FUJIFILM Wako Pure Chemical Corporation): methyl t-butyl ether (manufactured by FUJIFILM Wako Pure Chemical Corporation) (=1:1) was added to the filtrate to form a solid. After the solid was settled by centrifugation, the supernatant was removed. After the solid was washed with methyl t-butyl ether (manufactured by FUJIFILM Wako Pure Chemical Corporation), the solvent was removed by distillation under reduced pressure. After the resulting residue was purified by liquid chromatography, the solvent was removed by distillation under reduced pressure, followed by freeze drying to yield 14.3 mg of a white solid.

1H-NMR (DMSO-d6) δ: 8.42-8.27 (2H, m), 8.15 (1H, t), 8.03-7.76 (3H, m), 7.58-7.31 (5H, m), 7.29-7.12 (2H, m), 6.79 (1H, s), 4.57-4.47 (1H, m), 4.35-4.18 (2H, m), 4.02-3.83 (2H, m), 3.8-3.0 ($H_2O$), 3.00-2.63 (6H, m), 1.77-1.22 (6H, m)

Compounds 33 to 36

Compounds 33 to 36 were synthesized in the same manner as Compound 32. The reagents used for solid-phase peptide synthesis were changed as in the following table.

TABLE 6

| Compound | Resin for solid-phase synthesis | Step 1 | Step 2 | Step 3 |
|---|---|---|---|---|
| Compound 32 | S-Trityl-L-cysteine 2-chlorotrityl resin (0.62 mmol/g, 80.6 mg) | Fmoc-Lys(Boc)-OH | Fmoc-Tyr(O$^t$Bu)-OH | 1-Naphthylacetic acid |
| Compound 33 | S-Trityl-L-cysteine 2-chlorotrityl resin (0.62 mmol/g, 80.6 mg) | Fmoc-Lys(Boc)-OH | Fmoc-Phe-OH | 1-Naphthylacetic acid |
| Compound 34 | S-Trityl-L-cysteine 2-chlorotrityl resin (0.62 mmol/g, 80.6 mg) | Fmoc-Lys(Boc)-OH | Fmoc-His(Boc)-OH | 1-Naphthylacetic acid |
| Compound 35 | S-Trityl-L-cysteine 2-chlorotrityl resin (0.62 mmol/g, 80.6 mg) | Fmoc-Lys(Boc)-OH | 1-Naphthylacetic acid | None |
| Compound 36 | N-ε-(t-Butoxycarbonyl)-L-lysine 2-chlorotrityl resin (0.8 mmol/g, 100 mg) | Fmoc-Cys(Trt)-OH | 1-Naphthylacetic acid | None |

Compound 37

Into a recovery flask were placed 300 mg of 2,6-naphthalenediacetic acid (manufactured by A1 Biochem Lab), 295 mg of N-hydroxysuccinimide (manufactured by Tokyo Chemical Industry Co., Ltd.), and 10 mL of dimethylformamide (manufactured by FUJIFILM Wako Pure Chemical Corporation). Next, 671 mg of 1-(3-dimethylaminopropyl)-3-ethylcarbodiimide hydrochloride (manufactured by Dojindo Laboratories) was added, followed by stirring for 2 hours. After completion of the reaction, water was added to the reaction solution, and extraction was performed with ethyl acetate (manufactured by FUJIFILM Wako Pure Chemical Corporation). After the organic layer was washed with water and saturated saline solution, the organic layer was dried over anhydrous sodium sulfate (manufactured by FUJIFILM Wako Pure Chemical Corporation). The anhydrous sodium sulfate was filtered out, and the filtrate was subjected to vacuum distillation. The residue was then purified by silica gel chromatography (n-hexane (manufactured by FUJIFILM Wako Pure Chemical Corporation): ethyl acetate (manufactured by FUJIFILM Wako Pure Chemical Corporation) (=1:0 to 0.7:0.3)) to yield 480 mg of bis(1,5-dioxopyrrolidin-1-yl)2,2'-(naphthalene-2,6-diyl) diacetate as a white solid.

Observed MS (ESI m/z): 439.2 (M+H), RT (min): 1.21

Next, 56 mg of bis(1,5-dioxopyrrolidin-1-yl)2,2'-(naphthalene-2,6-diyl) diacetate, 23 mg of S-trityl-L-cysteine (manufactured by Tokyo Chemical Industry Co., Ltd.), and 1 mL of dimethylformamide (manufactured by FUJIFILM Wako Pure Chemical Corporation) were placed into a recovery flask, followed by stirring in an oil bath at 65° C. for 3 hours. The reaction solution was then cooled to room temperature, and 20 mg of t-butyl-(2R)-2-amino-6(t-butoxycarbonylamino)hexanoate (manufactured by Combi-Blocks, Inc.) was added, followed by stirring for 1 hour. After completion of the reaction, water was added to the reaction solution, and extraction was performed with ethyl acetate (manufactured by FUJIFILM Wako Pure Chemical Corporation). After the organic layer was washed with water and saturated saline solution, the organic layer was dried over anhydrous sodium sulfate (manufactured by FUJIFILM Wako Pure Chemical Corporation). The anhydrous sodium sulfate was filtered out, and the filtrate was subjected to vacuum distillation. Next, 1 mL of trifluoroacetic acid (TFA) (manufactured by FUJIFILM Wako Pure Chemical Corporation):triisopropylsilane (manufactured by Tokyo Chemical Industry Co., Ltd.):water (=95:2.5:2.5) was added. After 2 hours, 6 mL of n-hexane (manufactured by FUJIFILM Wako Pure Chemical Corporation):methyl t-butyl ether (manufactured by FUJIFILM Wako Pure Chemical Corporation) (=1:1) was added to form a solid. After the solid was settled by centrifugation, the supernatant was removed. After the solid was washed with methyl t-butyl ether (manufactured by FUJIFILM Wako Pure Chemical Corporation), the solvent was removed by distillation under reduced pressure. After the resulting residue was purified by liquid chromatography, the solvent was removed by distillation under reduced pressure, followed by freeze drying to yield 1.2 mg of a white solid.

Compound 38

Into a recovery flask were placed 50 mg of 1,5-naphthalendiacetic acid synthesized by a technique described in literature (Rikagaku Kenkyusho Iho, 1942, vol. 21, p. 509, 518), 52 mg of N-hydroxysuccinimide (manufactured by Tokyo Chemical Industry Co., Ltd.), and 3 mL of dimethylformamide (manufactured by FUJIFILM Wako Pure Chemical Corporation). Next, 118 mg of 1-(3-dimethylaminopropyl)-3-ethylcarbodiimide hydrochloride (manufactured by Dojindo Laboratories) was added, followed by stirring for 2 hours. After completion of the reaction, water was added to the reaction solution, and extraction was performed with ethyl acetate (manufactured by FUJIFILM Wako Pure Chemical Corporation). After the organic layer was washed with water and saturated saline solution, the organic layer was dried over anhydrous sodium sulfate. The anhydrous sodium sulfate was filtered out, and the filtrate was subjected to vacuum distillation. The residue was then purified by silica gel chromatography (n-hexane (manufactured by FUJIFILM Wako Pure Chemical Corporation): ethyl acetate (manufactured by FUJIFILM Wako Pure Chemical Corporation) (=1:0 to 0.7:0.3)) to yield 80 mg of a white solid.

Observed MS (ESI m/z): 439.2 (M+H), RT (min): 1.21

Next, 80 mg of bis(1,5-dioxopyrrolidin-1-yl)2,2'-(naphthalene-1,5-diyl) diacetate, 33 mg of S-trityl-L-cysteine (manufactured by Tokyo Chemical Industry Co., Ltd.), and 1 mL of dimethylformamide (manufactured by FUJIFILM Wako Pure Chemical Corporation) were placed into a recovery flask, followed by stirring in an oil bath at 65° C. for 3 hours. The reaction solution was then cooled to room temperature, and 28 mg of t-butyl-(2R)-2-amino-6(t-butoxycarbonylamino)-hexanoate (manufactured by Combi-Blocks, Inc.) was added, followed by stirring for 1 hour. After completion of the reaction, water was added to the reaction solution, and extraction was performed with ethyl acetate (manufactured by FUJIFILM Wako Pure Chemical Corporation). After the organic layer was washed with water and saturated saline solution, the organic layer was dried over anhydrous sodium sulfate (manufactured by FUJIFILM Wako Pure Chemical Corporation). The anhydrous sodium sulfate was filtered out, and the filtrate was subjected to vacuum distillation. Next, 1 mL of trifluoroacetic acid (TFA) (manufactured by FUJIFILM Wako Pure Chemical Corporation):triisopropylsilane (manufactured by Tokyo Chemical Industry Co., Ltd.):water (=95:2.5:2.5) was added. After 2 hours, 6 mL of n-hexane (manufactured by FUJIFILM Wako Pure Chemical Corporation):methyl t-butyl ether (manufactured by FUJIFILM Wako Pure Chemical Corporation) (=1:1) was added to form a solid. After the solid was settled by centrifugation, the supernatant was removed. After the solid was washed with methyl t-butyl ether (manufactured by FUJIFILM Wako Pure Chemical Corporation), the solvent was removed by distillation under reduced pressure. After the resulting residue was purified by liquid chromatography, the solvent was removed by distillation under reduced pressure, followed by freeze drying to yield 6.5 mg of a white solid.

1H-NMR (DMSO-d6) δ: 8.51-8.43 (2H, m), 8.06-7.99 (2H, m), 7.80-7.54 (2H, br), 7.48-7.41 (4H, m), 6.59-6.50 (1H, m), 4.40-4.31 (1H, m), 4.24-4.14 (1H, m), 4.07-3.89 (4H, m), 3.8-3.0 ($H_2O$), 2.93-2.62 (4H, m), 1.82-1.21 (8H, m)

The structures of Compounds 1 to 38 are shown below.

Compound 1

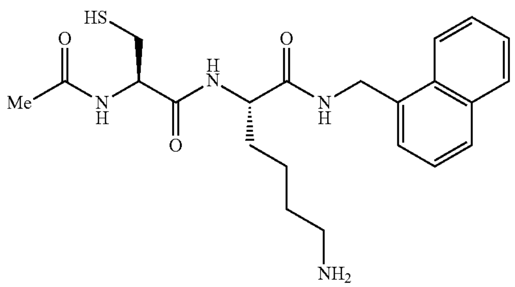

Compound 2

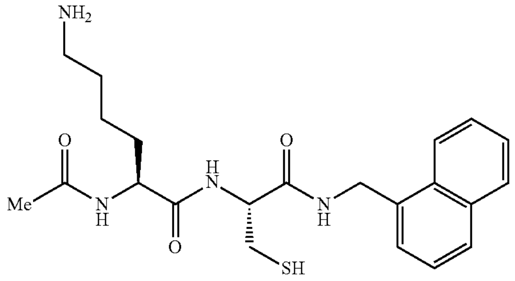

Compound 3

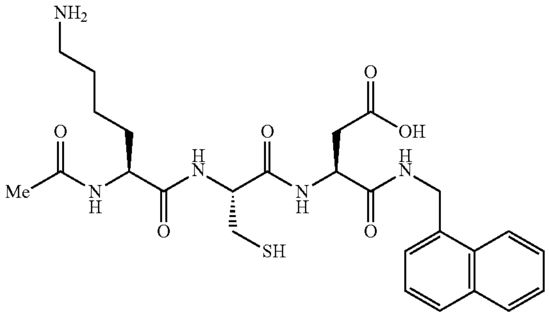

Compound 4

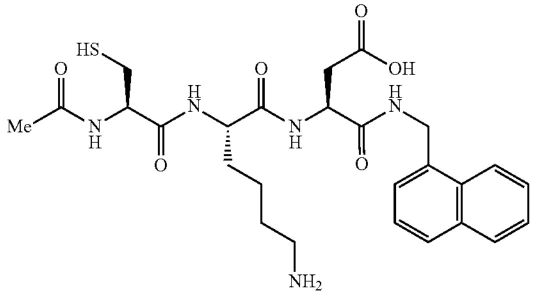

Compound 5

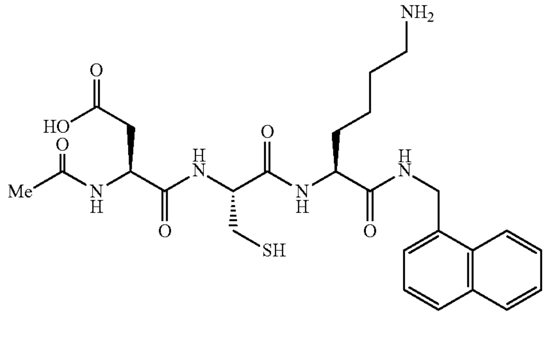

-continued
Compound 6
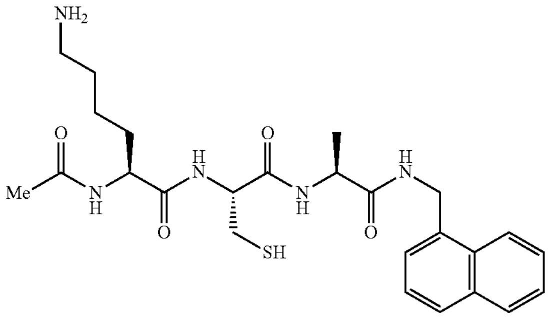
Compound 7
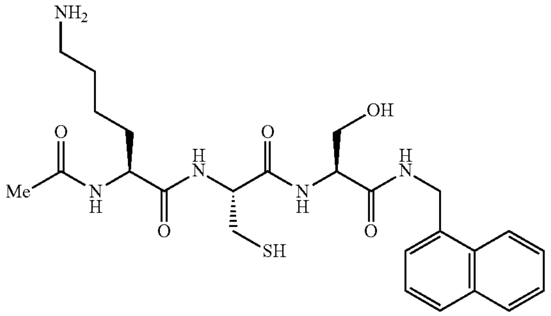
Compound 8
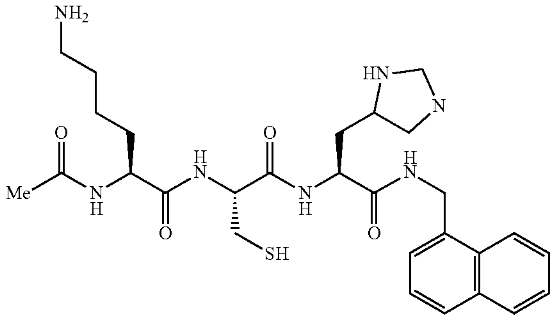
Compound 9
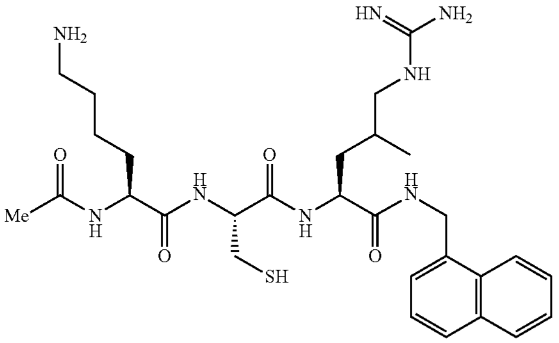
-continued
Compound 10
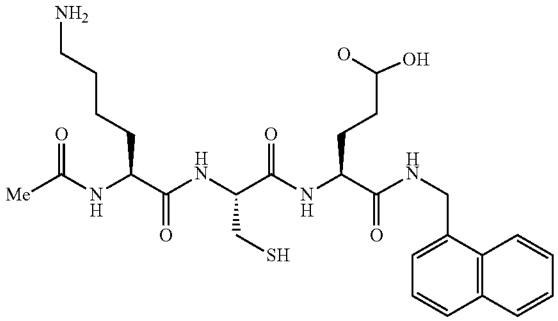
Compound 11
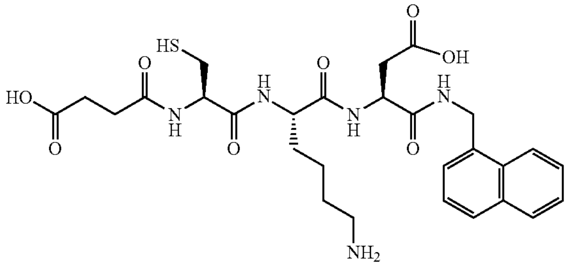
Compound 12
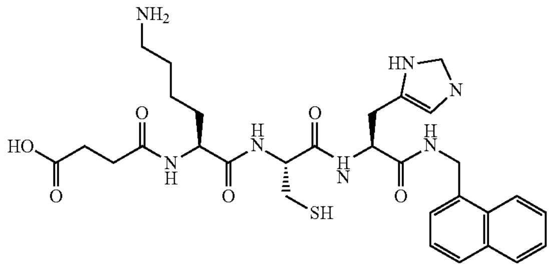
Compound 13
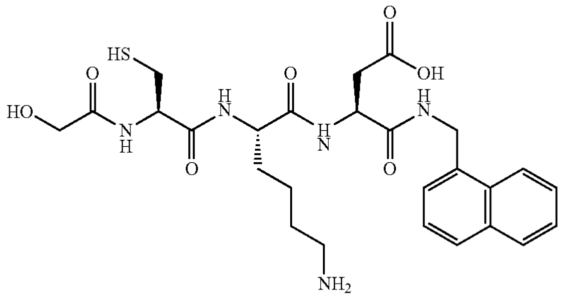
Compound 14
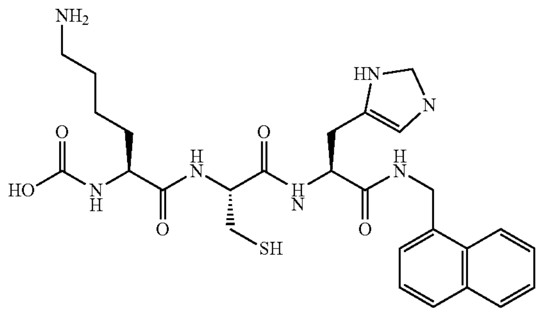

-continued
Compound 15
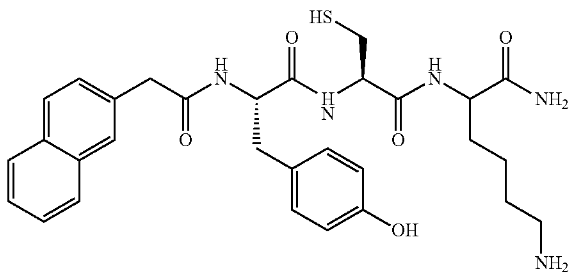
Compound 16
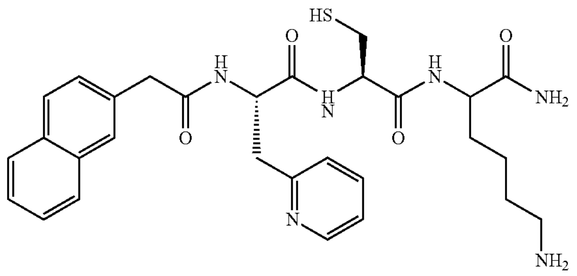
Compound 17
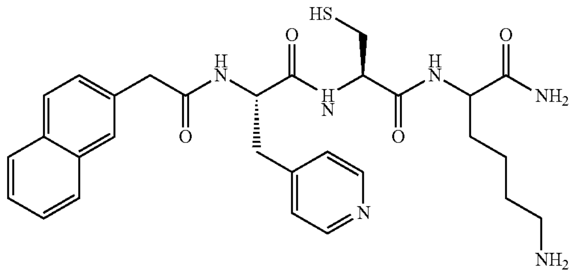
Compound 18
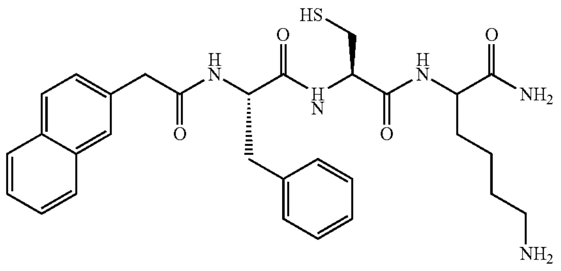
Compound 19
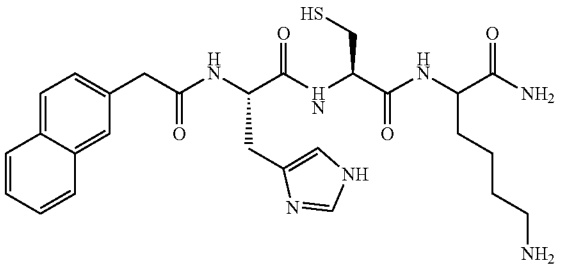
-continued
Compound 20
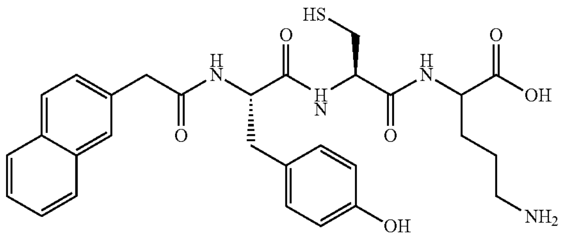
Compound 21
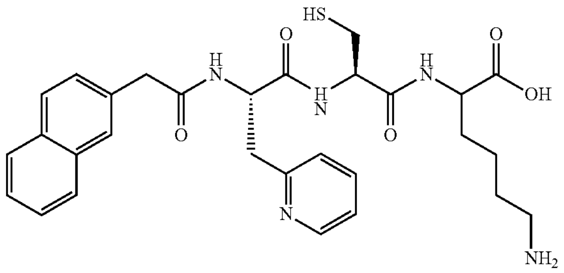
Compound 22
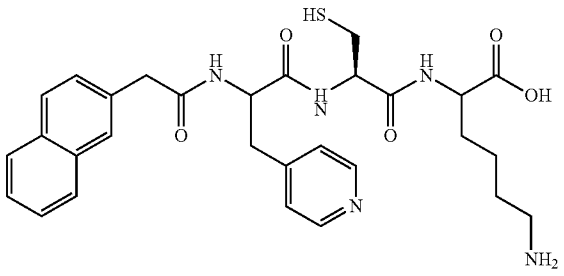
Compound 23
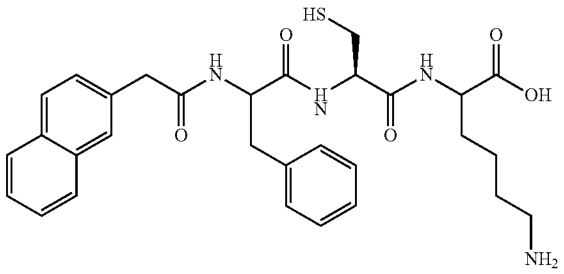
Compound 24
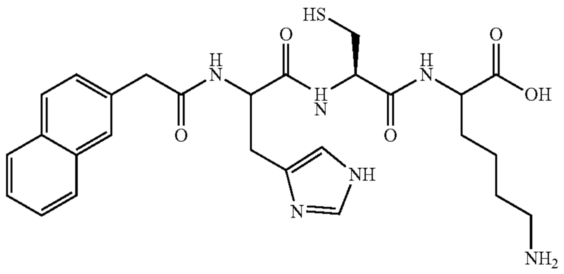

-continued
Compound 25
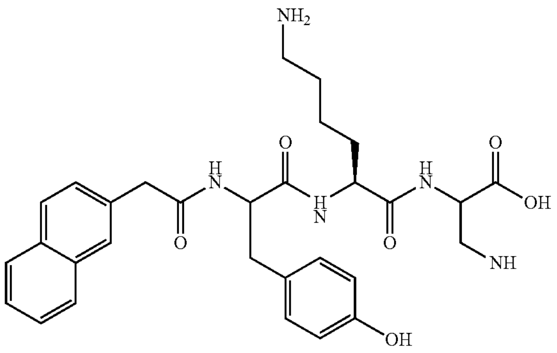
Compound 26
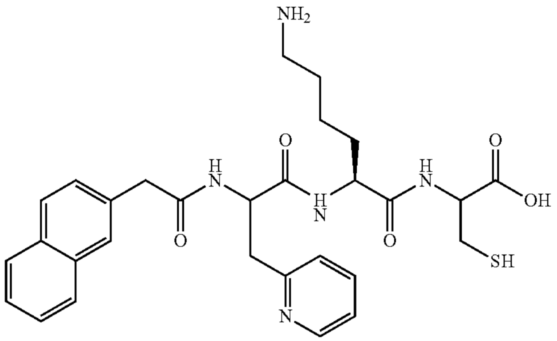
Compound 27
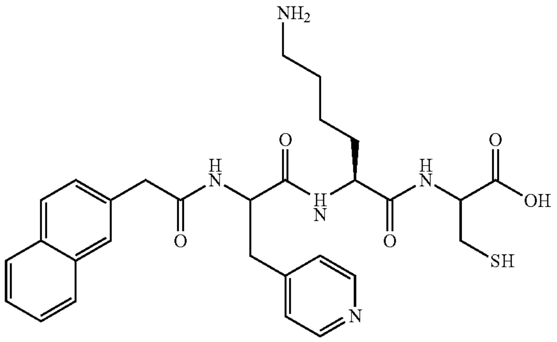
Compound 28
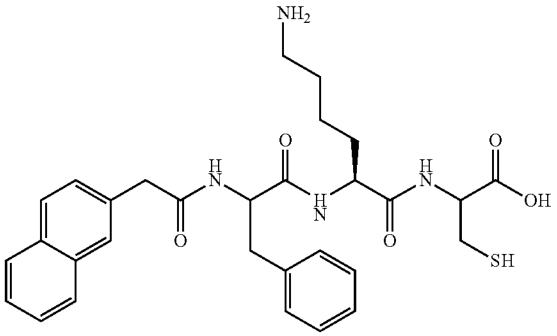
-continued
Compound 29
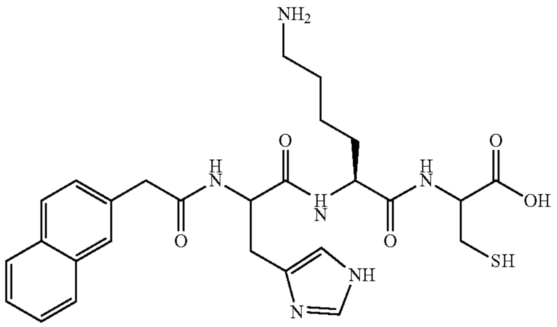
Compound 30
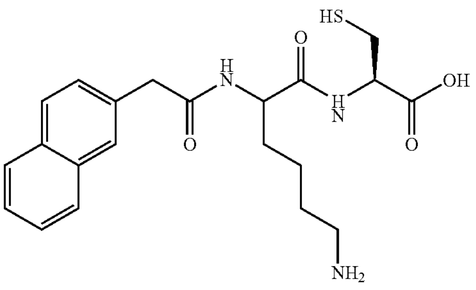
Compound 31
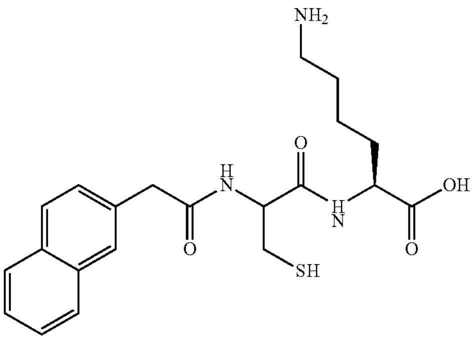
Compound 32
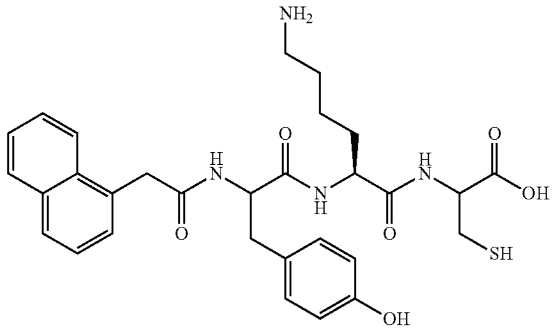

-continued

Compound 33

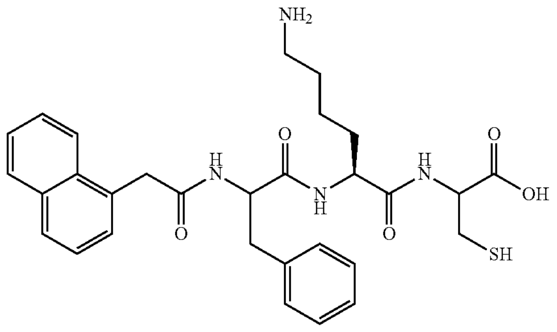

Compound 34

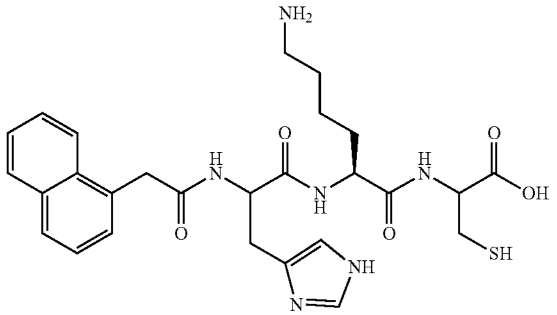

Compound 35

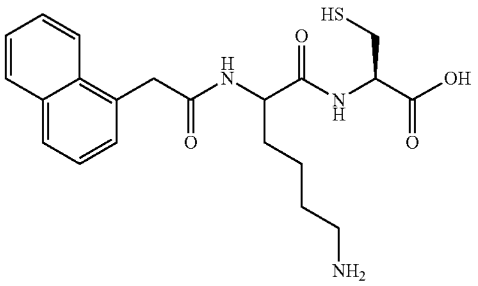

Compound 36

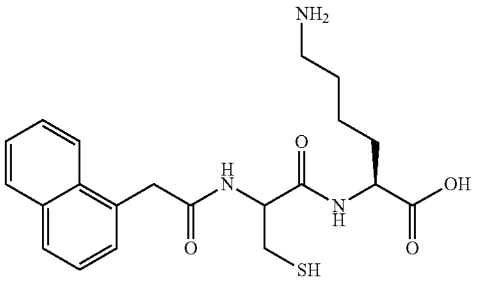

Compound 37

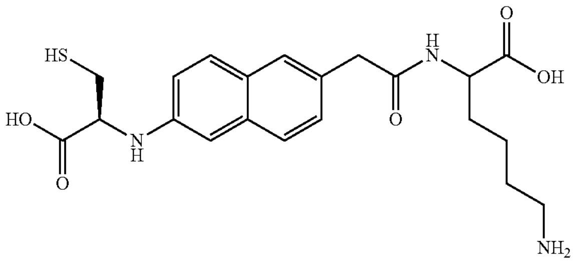

-continued

Compound 38

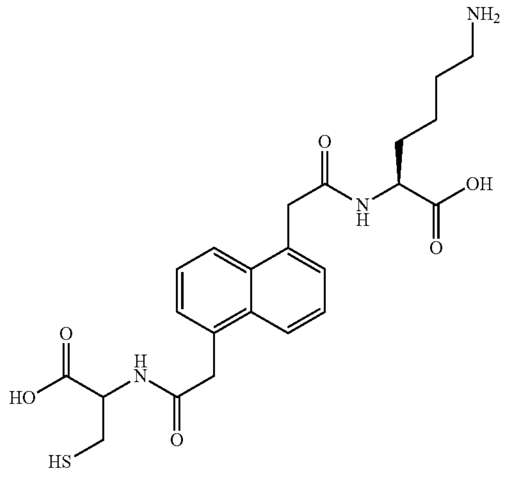

LC-MS Measurement Conditions and Measurement Results for Compounds 1 to 38

The mass spectrum (MS) was measured using an ACQUITY SQD LC/MS System (Waters Corporation, method for ionization: electrospray ionization (ESI)).

The retention time (RT) was measured using the ACQUITY SQD LC/MS System (Waters Corporation) and was expressed in minutes (min).

Column: Waters BEH C18 1.7 μm, 2.1×30 mm

Solvent: Liquid A: 0.1% formic acid-water; Liquid B: 0.1% formic acid-acetonitrile Gradient cycle: 0.00 min (Liquid A/Liquid B=95/5), 2.00 min (Liquid A/Liquid B=5/95), 3.00 min (Liquid A/Liquid B=95/5)

Flow rate: 0.5 mL/min

Column temperature: room temperature

Detection wavelength: 254 nm

TABLE 7

| | Observed MS (posi) | Retention time (RT) |
|---|---|---|
| Compound 1 | 431.2 | 0.87 |
| Compound 2 | 431.1 | 0.87 |
| Compound 3 | 546.2 | 0.87 |
| Compound 4 | 546.1 | 0.87 |
| Compound 5 | 546.1 | 0.87 |
| Compound 6 | 502.2 | 0.87 |
| Compound 7 | 518.2 | 0.83 |
| Compound 8 | 568.2 | 0.67 |
| Compound 9 | 587.2 | 0.72 |
| Compound 10 | 560.2 | 0.87 |
| Compound 11 | 604.4 | 0.83 |
| Compound 12 | 626.5 | 0.70 |
| Compound 13 | 562.2 | 0.81 |
| Compound 14 | 584.2 | 0.73 |
| Compound 15 | 580.2 | 0.91 |
| Compound 16 | 565.2 | 0.79 |
| Compound 17 | 566.1 | 0.67 |
| Compound 18 | 564.3 | 1.05 |
| Compound 19 | 554.3 | 0.67 |
| Compound 20 | 581.2 | 0.90 |
| Compound 21 | 566.2 | 0.79 |
| Compound 22 | 566.2 | 0.68 |
| Compound 23 | 565.3 | 1.07 |
| Compound 24 | 555.2 | 0.70 |
| Compound 25 | 581.2 | 0.93 |
| Compound 26 | 566.2 | 0.78 |
| Compound 27 | 566.2 | 0.69 |
| Compound 28 | 565.3 | 1.09 |

TABLE 7-continued

| | Observed MS (posi) | Retention time (RT) |
|---|---|---|
| Compound 29 | 555.2 | 0.68 |
| Compound 30 | 418.2 | 0.88 |
| Compound 31 | 418.2 | 0.87 |
| Compound 32 | 581.2 | 0.90 |
| Compound 33 | 565.2 | 1.06 |
| Compound 34 | 555.2 | 0.66 |
| Compound 35 | 418.2 | 0.86 |
| Compound 36 | 418.2 | 0.85 |
| Compound 37 | 476.3 | 0.65 |
| Compound 38 | 476.3 | 0.65 |

Example 2

Fourteen nucleophilic reagents with a naphthylmethyl group at the N-terminus thereof (Compounds 1 to 14) were evaluated.

Test Substances and Preparation of Solutions

Using the sensitizers shown in "(7-3) Evaluation of Reactivity with Sensitizers" above, 1 mmol/L solutions were prepared and used for testing.

Measurement Conditions

The nucleophilic reagent depletion (%) was determined under the HPLC measurement conditions shown in "(5) HPLC Measurement" above.

Results

(1) Stability of Nucleophilic Reagent

The residual fractions of the 14 nucleophilic reagents as prepared (0 hours) and after 24 hours were calculated. The results are shown in FIG. 1. The residual fractions of all 14 nucleophilic reagents were 30% or more after 0 hours. In particular, the residual fractions of all nucleophilic reagents except Compounds 13 and 14 were 80% or more after 0 hours. There was no nucleophilic reagent whose residual fraction decreased considerably after 24 hours.

(2) Reactivity of Nucleophilic Reagent (Primary Evaluation with Three Substances)

Figure 2:
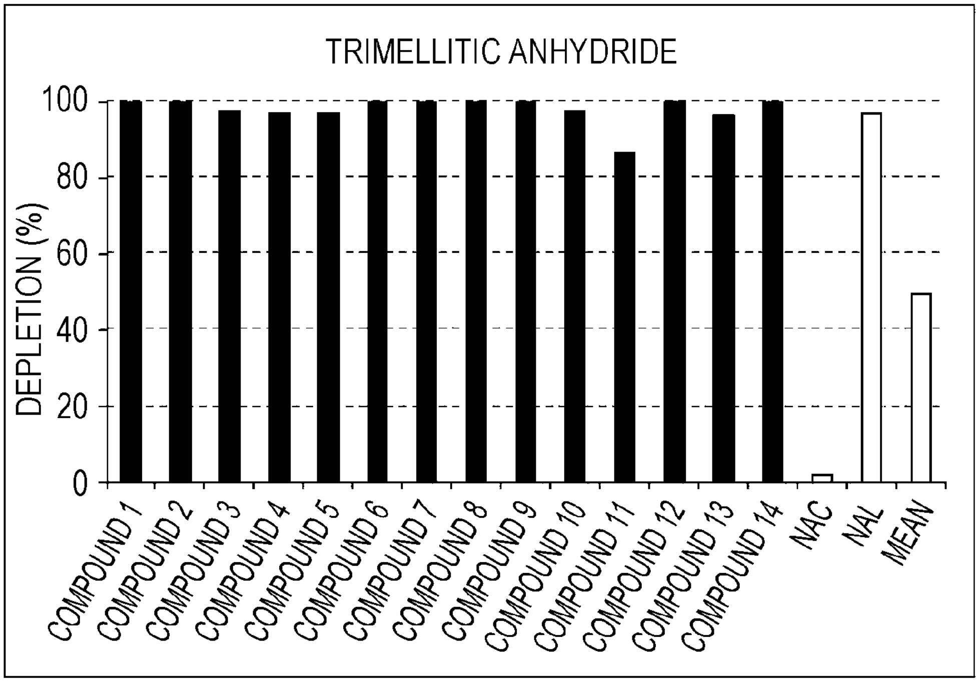
FIG. 2 shows reactivity measurement results for the 14 nucleophilic reagents (Compounds 1 to 14)
Figure 3:
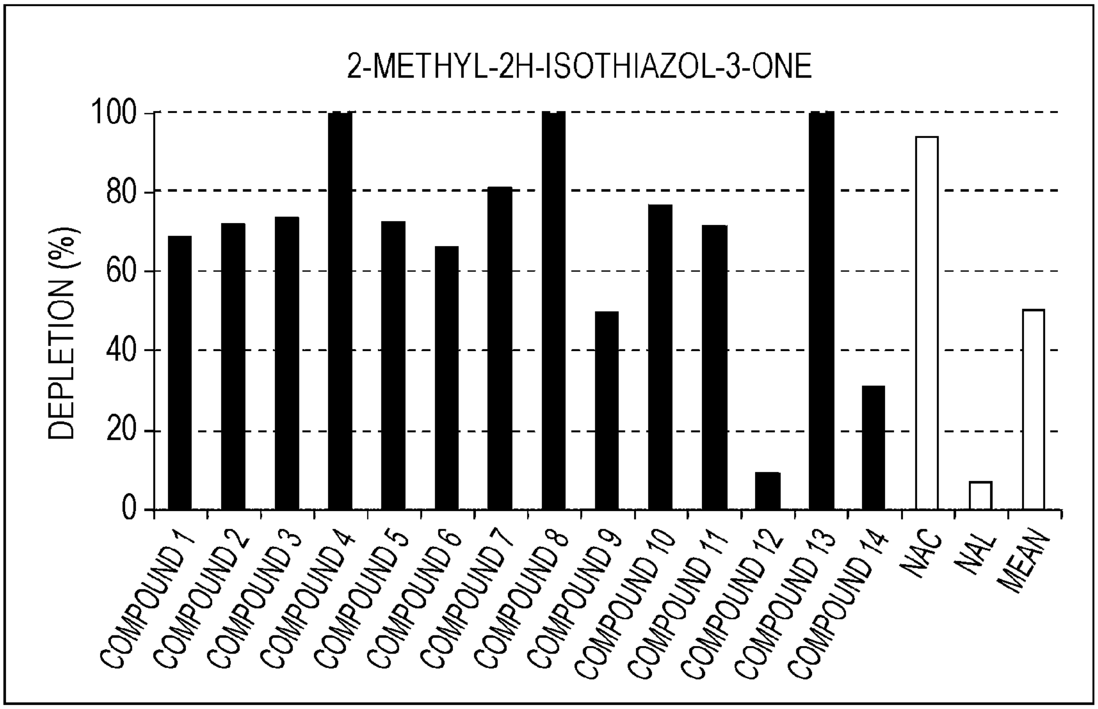
FIG. 3 shows reactivity measurement results for the 14 nucleophilic reagents (Compounds 1 to 14)
Figure 4:
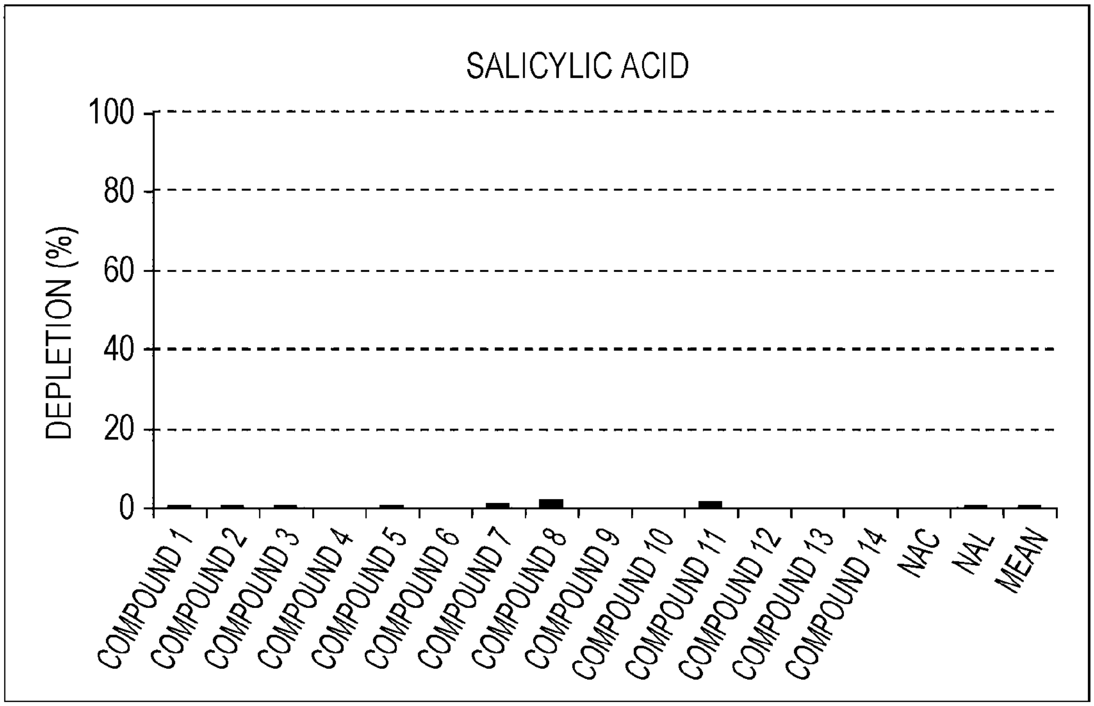
FIG. 4 shows reactivity measurement results for the 14 nucleophilic reagents (Compounds 1 to 14)
Figure 5:
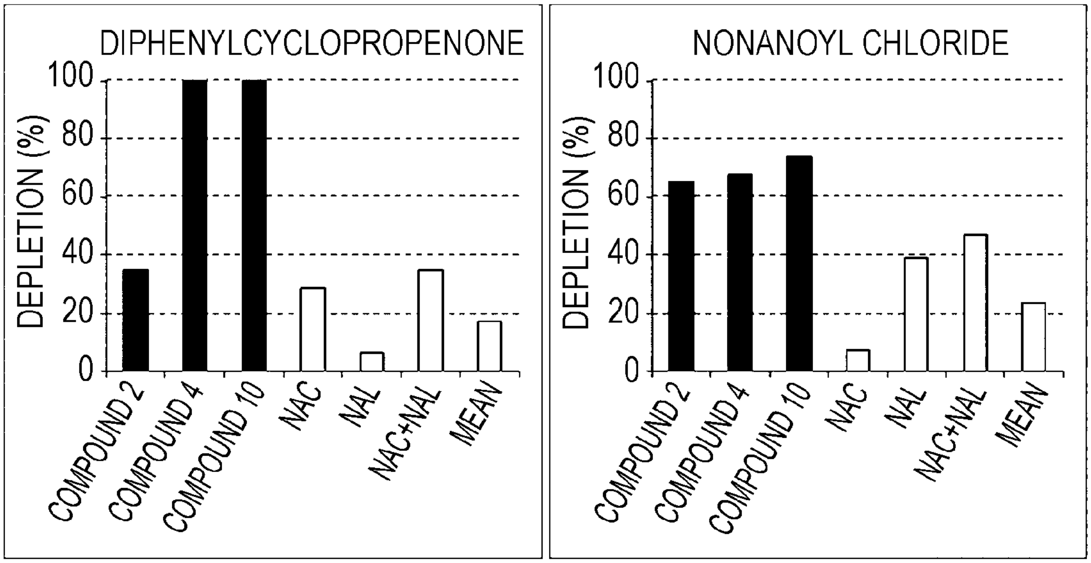
FIG. 5 shows reactivity measurement results for three nucleophilic reagents (Compounds 2, 4, and 10)
Figure 6:
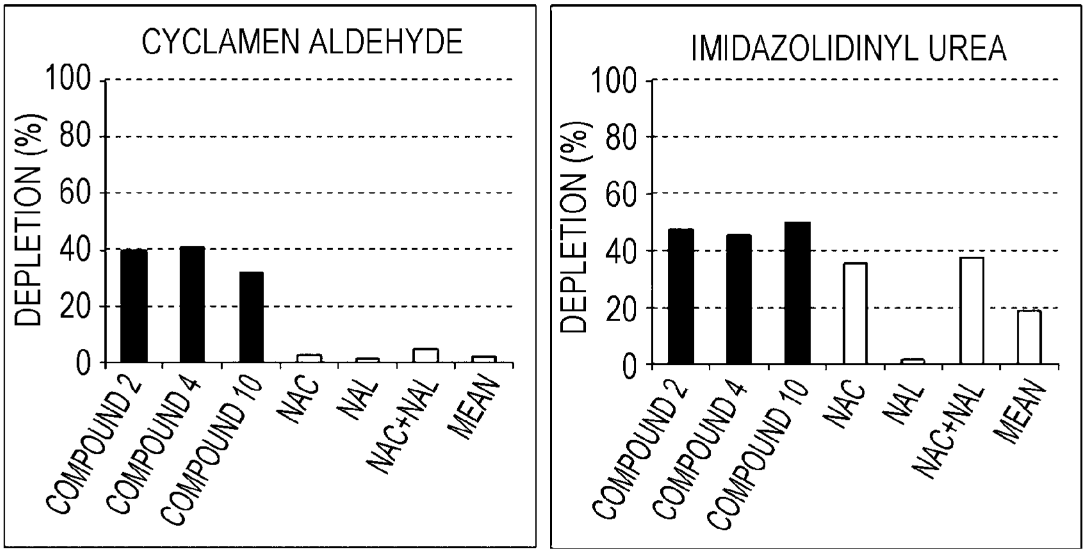
FIG. 6 shows reactivity measurement results for the three nucleophilic reagents (Compounds 2, 4, and 10)
Figure 7:
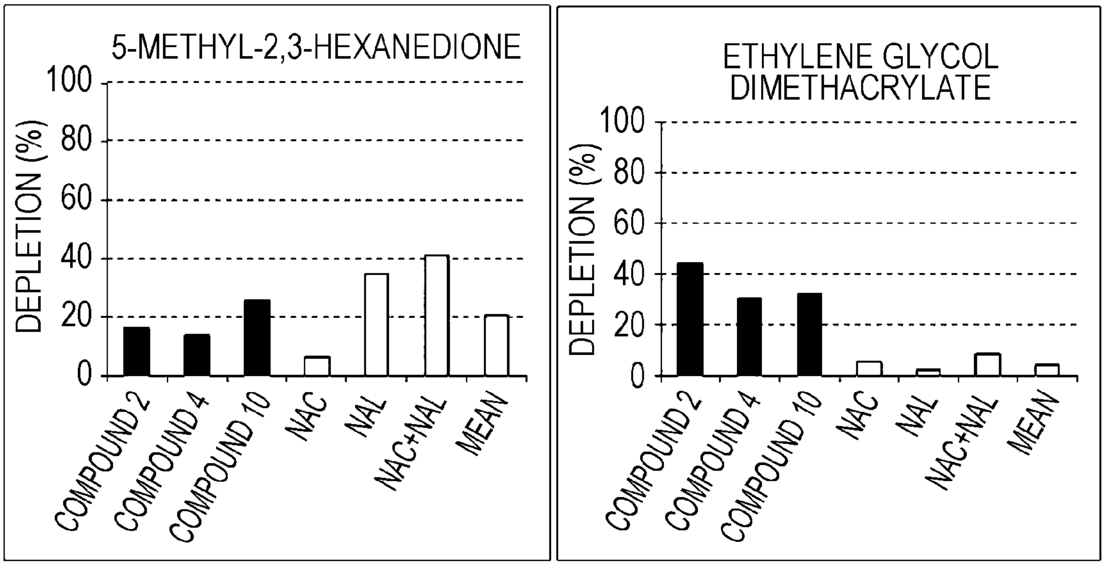
FIG. 7 shows reactivity measurement results for the three nucleophilic reagents (Compounds 2, 4, and 10)
Figure 8:
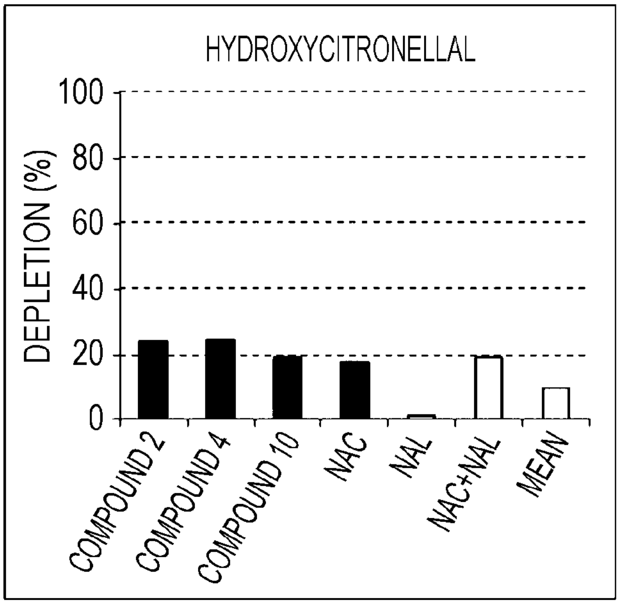
FIG. 8 shows reactivity measurement results for the three nucleophilic reagents (Compounds 2, 4, and 10)

The reactivity of the 14 nucleophilic reagents with three evaluation substances was calculated. The results are shown in FIGS. 2 to 4. Trimellitic anhydride, which is known to mainly react with lysine, exhibited a reactivity of almost 100% for all nucleophilic reagents. This is comparable to the reactivity of NAL alone. In addition, 2-methyl-2H-isothiazol-3-one, which is known to mainly react with cysteine, exhibited a reactivity of about 50% to about 100%. In particular, Compounds 4, 8 and 13 exhibited a reactivity as high as almost 100%. This value exceeds the reactivity of NAC alone. On the other hand, salicylic acid, which is a non-sensitizer, was almost completely unreactive with any nucleophilic reagent. These results show that all nucleophilic reagents exhibit a reactivity higher than or equal to that of NAC or NAL alone with sensitizers but are completely unreactive with non-sensitizers and can thus be used as detection reagents for sensitizers.

(3) Reactivity of Nucleophilic Reagent (Secondary Evaluation with Seven Substances)

Three nucleophilic reagents that were thought to have high performance in the above results, namely, Compounds 2, 4, and 10, were subjected to secondary evaluation. The results are shown in FIGS. 5 to 8. The evaluation was performed for seven sensitizers including five sensitizers that are difficult to evaluate in conventional methods for measuring skin sensitization (cyclamen aldehyde, imidazolidinyl urea, 5-methyl-2,3-hexanedione, ethylene glycol dimethacrylate, and hydroxycitronellal). The results show that all six substances except 5-methyl-2,3-hexanedione exhibited a reactivity higher than that of NAC or NAL alone and the mean depletion. This demonstrates that there is a possibility that sensitizers can be predicted with a higher sensitivity than conventional methods for measuring skin sensitization and that there is a high possibility that sensitizers that are difficult to evaluate by conventional methods for measuring skin sensitization can also be correctly predicted. It is believed that 5-methyl-2,3-hexanedione can also be correctly predicted as a sensitizer because the depletions were similar to the mean depletion of NAC and NAL.

Example 3

Twenty-two nucleophilic reagents with a naphthylmethyl group at the C-terminus thereof (Compounds 15 to 36)) were evaluated.

Test Substances and Preparation of Solutions

Using the sensitizers shown in "(7-3) Evaluation of Reactivity with Sensitizers" above, 1 mmol/L solutions were prepared and used for testing.

Measurement Conditions

The nucleophilic reagent depletion (%) was determined under the HPLC measurement conditions shown in "(5) HPLC Measurement" above.

Results

(1) Stability of Nucleophilic Reagent

Figure 9:
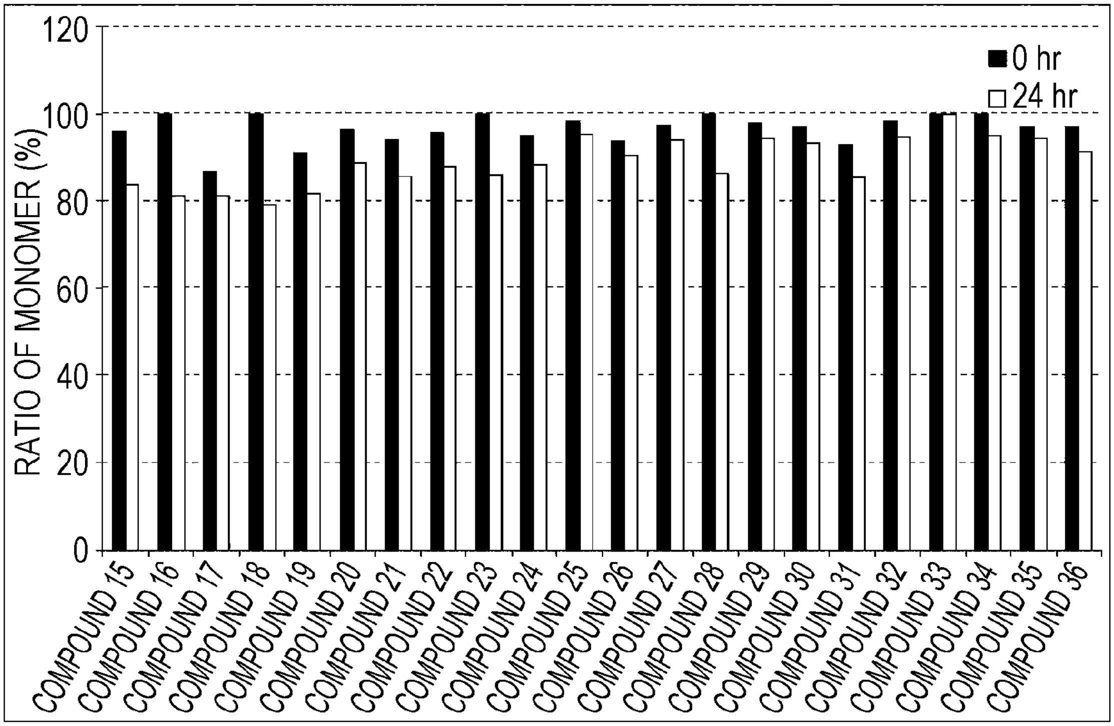
FIG. 9 shows stability measurement results for 22 nucleophilic reagents (Compounds 15 to 36)

The residual fractions of the 22 nucleophilic reagents as prepared (0 hours) and after 24 hours were calculated. The results are shown in FIG. 9. The results show that the residual fractions of all nucleophilic reagents were 80% or more after 0 hours and that there was no nucleophilic reagent whose residual fraction decreased considerably after 24 hours.

(2) Reactivity of Nucleophilic Reagent (Primary Evaluation with Three Substances)

Figure 10:
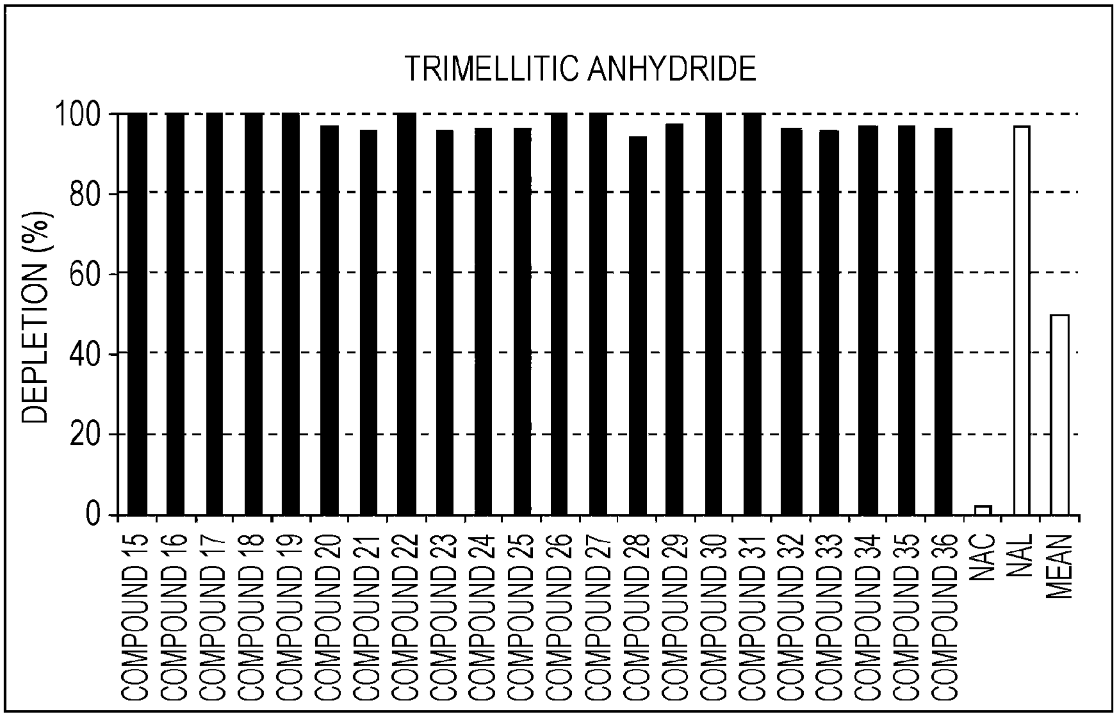
FIG. 10 shows reactivity measurement results for the 22 nucleophilic reagents (Compounds 15 to 36)
Figure 11:
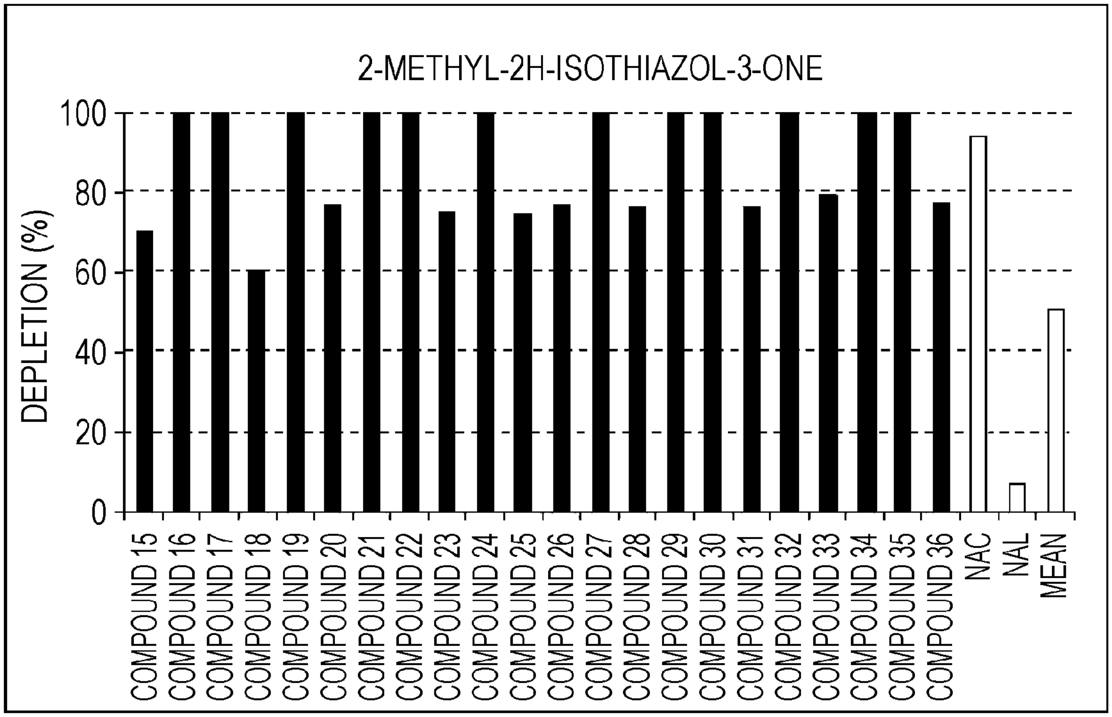
FIG. 11 shows reactivity measurement results for the 22 nucleophilic reagents (Compounds 15 to 36)
Figure 12:
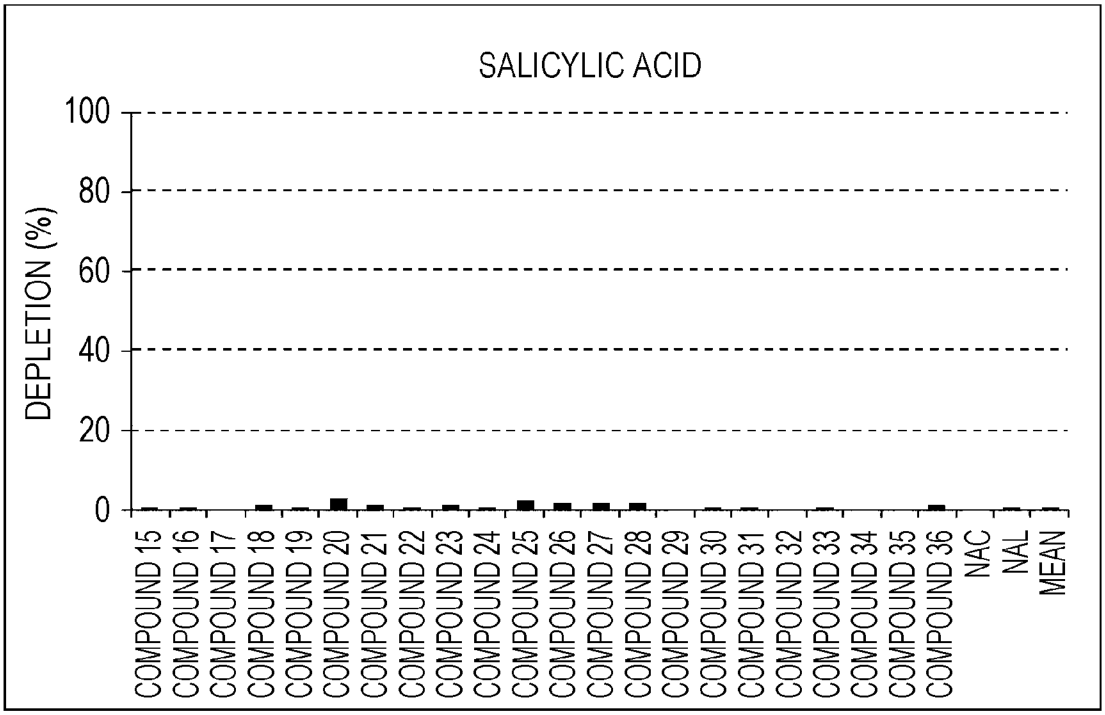
FIG. 12 shows reactivity measurement results for the 22 nucleophilic reagents (Compounds 15 to 36)

The reactivity of the 22 nucleophilic reagents with three evaluation substances was calculated. The results are shown in FIGS. 10 to 12. Trimellitic anhydride, which is known to mainly react with lysine, exhibited a reactivity of almost 100% for all nucleophilic reagents. This is comparable to the reactivity of NAL alone. In addition, 2-methyl-2H-isothiazol-3-one, which is known to mainly react with cysteine, exhibited a reactivity of about 60% to about 100%. In particular, Compounds 16, 17, 19, 21, 22, 24, 27, 29, and 30 exhibited a reactivity as high as almost 100%. This value exceeds the reactivity of NAC alone. On the other hand, salicylic acid, which is a non-sensitizer, was almost completely unreactive with any nucleophilic reagent. These results show that all nucleophilic reagents exhibit a reactivity higher than or equal to that of NAC or NAL alone with sensitizers but are completely unreactive with non-sensitizers and can thus be satisfactorily used as detection reagents for sensitizers.

Example 4

Two nucleophilic reagents (Compounds 37 and 38) with a naphthylmethyl backbone (i.e., a structure in which naphthalene is disubstituted with amino acids) were evaluated. Compounds 37 and 38 are substances in which cysteine and lysine are attached at symmetrical substitution positions of a naphthalene ring with $CH_2$—CO therebetween.

Test Substances and Preparation of Solutions

Using the sensitizers shown in "(7-3) Evaluation of Reactivity with Sensitizers" above, 1 mmol/L solutions were prepared and used for testing.

Measurement Conditions

The nucleophilic reagent depletion (%) was determined under the HPLC measurement conditions shown in "(5) HPLC Measurement" above.

Results

(1) Stability of Nucleophilic Reagent

Figure 13:
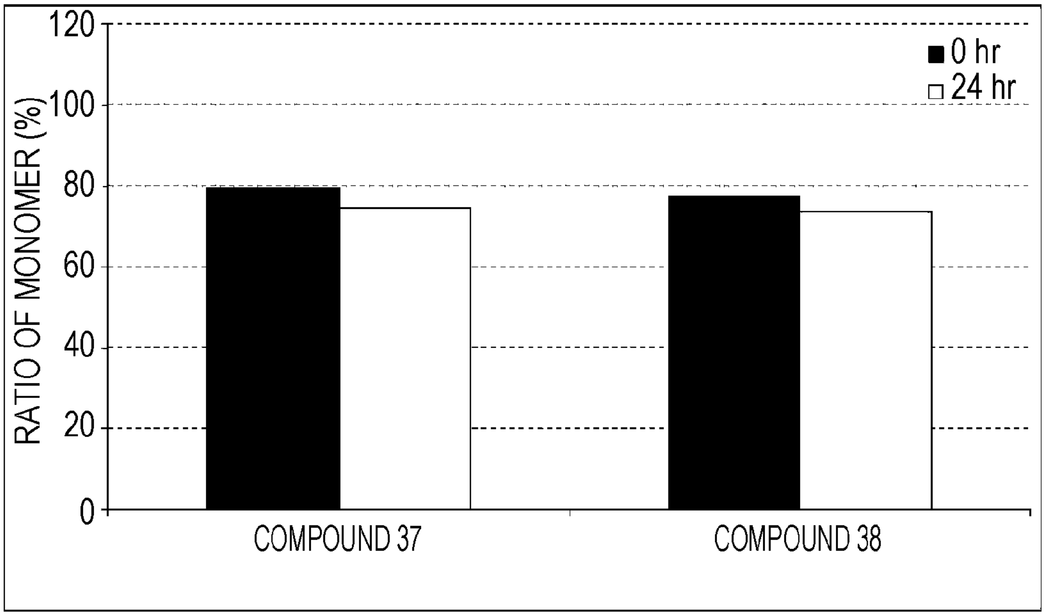
FIG. 13 shows stability measurement results for two nucleophilic reagents (Compounds 37 and 38)

The residual fractions of the two nucleophilic reagents as prepared (0 hours) and after 24 hours were calculated. The results are shown in FIG. 13. The results show that the residual fractions of all nucleophilic reagents were about 80% after 0 hours and that there was no nucleophilic reagent whose residual fraction decreased considerably after 24 hours.

(2) Reactivity of Nucleophilic Reagent (Primary Evaluation with Three Substances)

Figure 14:
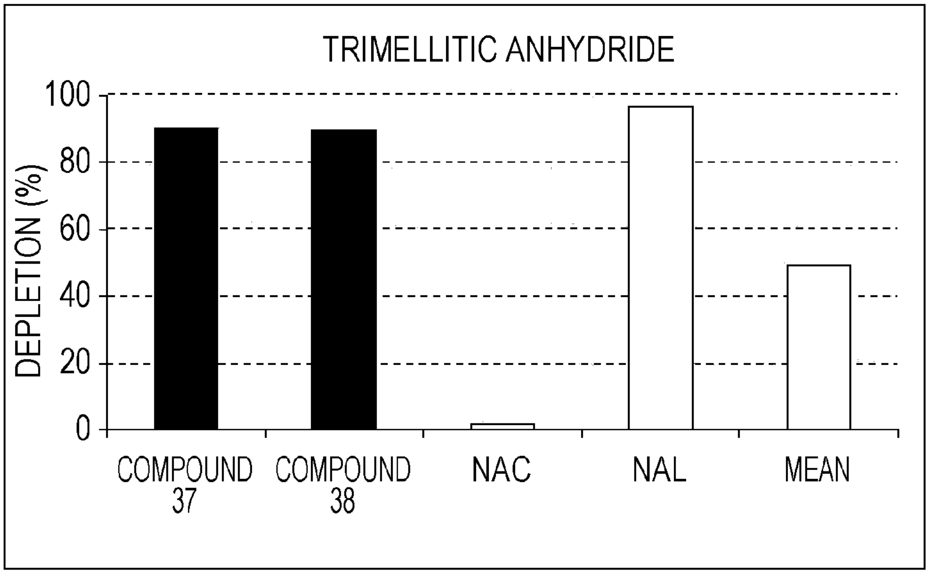
FIG. 14 shows reactivity measurement results for the two nucleophilic reagents (Compounds 37 and 38)
Figure 15:
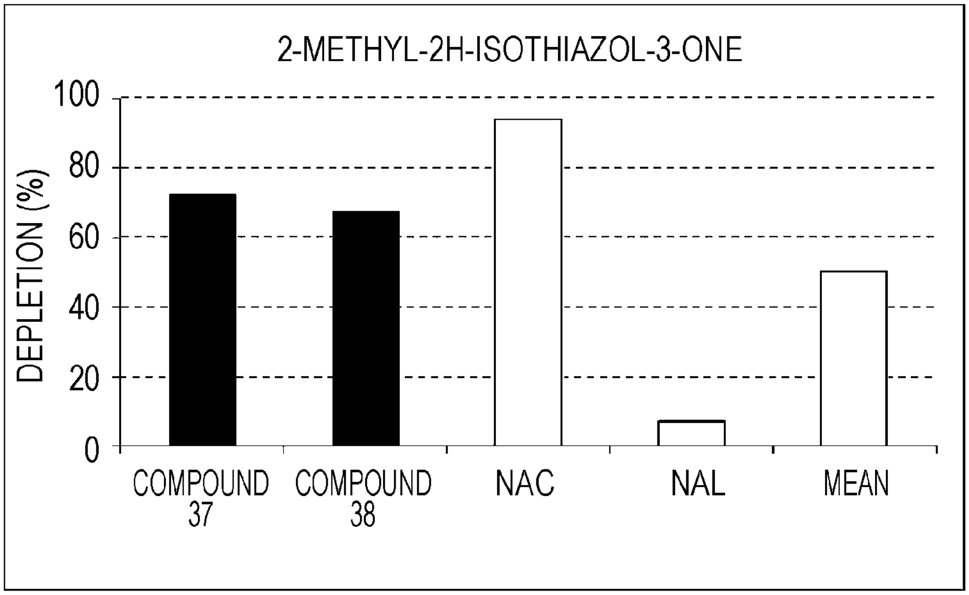
FIG. 15 shows reactivity measurement results for the two nucleophilic reagents (Compounds 37 and 38)
Figure 16:
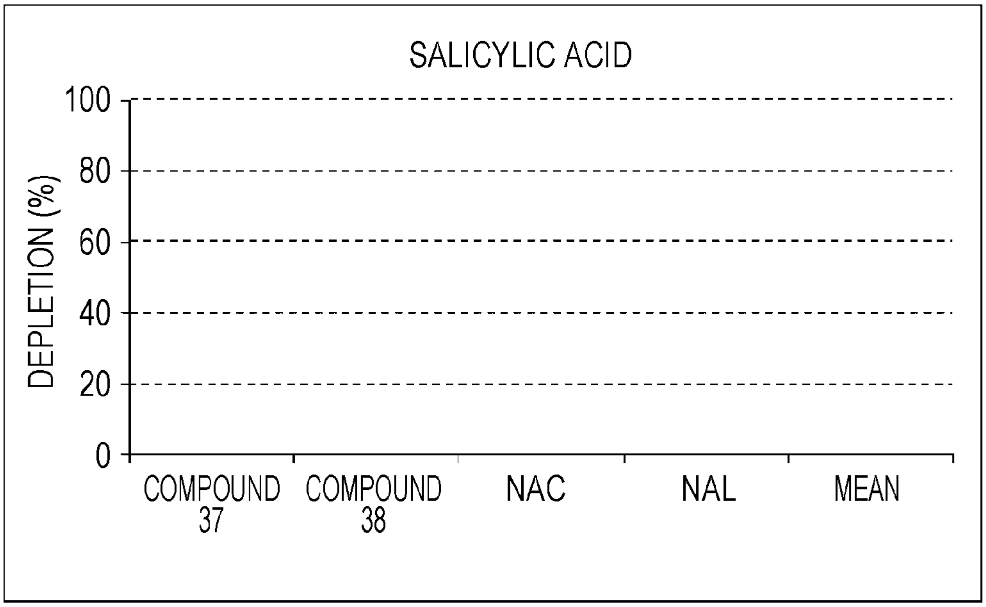
FIG. 16 shows reactivity measurement results for the two nucleophilic reagents (Compounds 37 and 38)

The reactivity of the two nucleophilic reagents with three evaluation substances was calculated. The results are shown in FIGS. 14 to 16. Trimellitic anhydride, which is known to mainly react with lysine, exhibited a reactivity of almost 90% for all nucleophilic reagents. This is comparable to the reactivity of NAL alone. In addition, 2-methyl-2H-isothiazol-3-one, which is known to mainly react with cysteine, exhibited a reactivity of about 70%. The results show that the nucleophilic reagents were completely unreactive with salicylic acid, which is a non-sensitizer, and can thus be satisfactorily used as detection reagents for sensitizers.

Example 5

Two reagents (NAC and NAL) are originally separately reacted with a test substance; it was investigated whether the two reagents can be simultaneously used as one reaction solution for testing.

Test Substances

Using the three substances shown in the following table, 1 mmol/L solutions were prepared and used for testing.

TABLE 8

| No. | Evaluation substance | CAS No. | Molecular weight | Purity (%) | Skin sensitization | Solvent used |
|---|---|---|---|---|---|---|
| 1 | Diphenylcyclopropenone (FUJIFILM Wako Pure Chemical Corporation) | 886-38-4 | 206.24 | 98 | Strong sensitizer (mainly react with cysteine) | Acetonitrile |
| 2 | Nonanoyl chloride (Tokyo Chemical Industry Co., Ltd.) | 764-85-2 | 176.68 | 97 | Moderate sensitizer (mainly react with lysine) | Acetonitrile |
| 3 | Salicylic acid (FUJIFILM Wako Pure Chemical Corporation) | 69-72-7 | 138.12 | 99.5 | Non-sensitizer | Acetonitrile |

Reaction Conditions

(1) Nucleophilic Reagent Stock Solution

A solution prepared by dissolving NAC and NAL in a phosphate buffer solution (pH 8.0) prepared in accordance with "(1-2) 100 mmol/L Phosphate Buffer Solution (pH 8.0)" of "(1) Preparation of Various Solutions" above such that the concentration of each nucleophilic reagent was 13.333 μmol/L was used as a nucleophilic reagent stock solution.

(2) Addition

Test substance solutions were prepared on a 96-well plate (U96 PP-0.5 ML NATURAL, Thermo (NUNC)), mainly using a 12-channel pipette, and the reagent was added in the following amount:

Nucleophilic reagent stock solution: NAC and NAL, 75 μL each

Test substance solution: 50 μL

(3) Reaction and Reaction Stop

The procedures described in "(4-2) Reaction" and "(4-3) Reaction Stop" of "(4) Reaction" above were performed.

Measurement Conditions

To simultaneously detect NAC and NAL, a measurement was performed under the HPLC conditions shown in the following table.

TABLE 9

| | |
|---|---|
| HPLC instrument | LC-20A (Prominence) series (Shimadzu Corporation) |
| Column | Wakopak (registered trademark) Core C18 ADRA Column (3.0 × 150 mm, 2.6 μm) (FUJIFILM Wako Pure Chemical Corporation) |
| Detector | UV detection: SPD-M20A (Shimadzu Corporation) |
| Detection wavelength | UV detection: 281 nm |
| Column temperature | 40° C. |
| Sample temperature | 25° C. |
| Injection volume | 8-20 μL |
| Eluent | A: water (0.1% trifluoroacetic acid)<br>B: acetonitrile (0.1% trifluoroacetic acid) |
| Measurement time | 25 minutes |

Elution conditions
Condition 1

| Time (mm) | Flow rate (mL/min) | % A | % B |
|---|---|---|---|
| 0.0 | 0.3 | 90 | 10 |
| 14.5 | 0.3 | 45 | 55 |
| 15 | 0.3 | 0 | 100 |
| 18 | 0.3 | 0 | 100 |
| 18.5 | 0.3 | 90 | 10 |
| 25 | End | | |

In addition, the nucleophilic reagent depletion (%) was determined by the method described in "(6) Data Analysis" above.

Results

Figure 17:
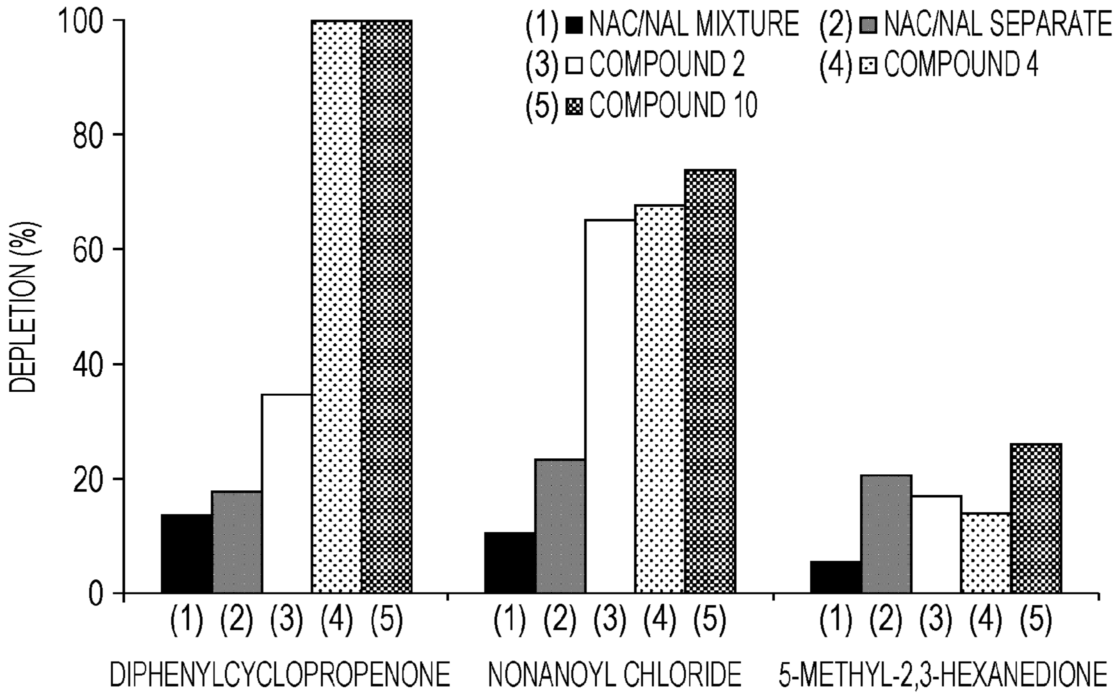
FIG. 17 shows reactivity measurement results for separate and mixture systems of two nucleophilic reagents (NAC and NAL) and three nucleophilic reagents (Compounds 2, 4, and 10).

Because NAC and NAL were soluble in the same phosphate buffer solution, this solution was used for measurement for the three evaluation substances. The results are shown in FIG. 17.

The depletions of the nucleophilic reagent prepared by mixing NAC and NAL together ("NAC/NAL mixture" in the figure) for the three evaluation substances were 13.5%, 10.5%, and 5.5%. In contrast, the depletions of a conventional method in which NAC and NAL were separately prepared and used for measurement ("NAC/NAL separate" in the figure) were 17.5%, 23.4%, and 20.6%, indicating that the depletion decreased when the nucleophilic reagents were mixed together. On the other hand, when measurements were performed with Compounds 2, 4, and 10 according to the present invention, their respective depletions were 34.9%, 100%, and 100% for diphenylcyclopropenone, 65.2%, 67.6%, and 73.8% for nonanoyl chloride, and 16.7%, 13.8%, and 26.0% for 5-methyl-2,3-hexanedione. In particular, the depletions of Compounds 2, 4, and 10 increased considerably for diphenylcyclopropenone and nonanoyl chloride as compared to the NAC/NAL mixture system and the NAC/NAL separate system. For 5-methyl-2,3-hexanedione, the depletions of Compounds 2, 4, and 10 were similar to that of NAC/NAL separate system but increased considerably as compared to the NAC/NAL mixture system.

DISCUSSION

It was found that, although the testing time for a system in which NAC and NAL are simply mixed together can be reduced to about half the testing time for a conventional system in which NAC and NAL are separately prepared, the measurement results, i.e., the depletions, for both systems decreased considerably, and there is a high possibility that a sensitizer cannot be correctly predicted. In contrast, it was found that all compounds according to the present invention tend to exhibit higher depletions than the NAC/NAL mixture system and the NAC/NAL separate system. The above results show that the use of a peptide according to the present invention allows the testing time to be reduced to a level similar to that of the NAC/NAL mixture system and also allows sensitization to be predicted with a higher sensitivity than the NAC/NAL mixture system and the conventional separate system.

What is claimed is:

1. A compound represented by the following formula (5):

(5)

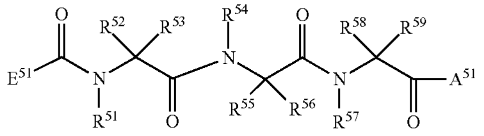

wherein $A^{51}$ represents a group having an absorption spectrum in the ultraviolet, visible, or near-infrared region, $R^{51}$, $R^{54}$, and $R^{57}$ are hydrogen atoms, $R^{52}$, $R^{53}$, $R^{55}$, $R^{56}$, $R^{58}$, and $R^{59}$ represent a hydrogen atom or a substituent, provided that at least one of the substituents represented by $R^{52}$, $R^{53}$, $R^{55}$, $R^{56}$, $R^{58}$ and $R^{59}$ has a thiol group, and at least one of the substituents represented by $R^{52}$, $R^{53}$, $R^{55}$, $R^{56}$, $R^{58}$, and $R^{59}$ has an amino group, and $E^{51}$ represents an alkyl group having 1 to 6 carbon atoms that is optionally substituted with a substituent selected from the group consisting of a carboxyl group, an amino group, a hydroxy group, a guanidyl group, a pyridine ring, and an imidazole ring.

2. The compound according to claim 1, wherein the group having an absorption spectrum in the ultraviolet, visible, or near-infrared region is a group having a naphthalene ring structure.

3. The compound according to claim 1, wherein $A^{51}$ in formula (5) is any of:

(C)

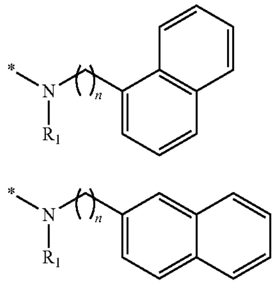

(D)

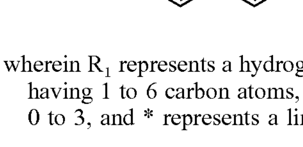

wherein $R_1$ represents a hydrogen atom or an alkyl group having 1 to 6 carbon atoms, n represents an integer of 0 to 3, and * represents a linking site.

* * * * *